United States Patent
Ma et al.

(10) Patent No.: US 10,422,552 B2
(45) Date of Patent: Sep. 24, 2019

(54) RECEIVERS FOR CONCENTRATING SOLAR POWER GENERATION

(71) Applicant: Alliance for Sustainable Energy, LLC, Golden, CO (US)

(72) Inventors: Zhiwen Ma, Golden, CO (US); Craig S. Turchi, Lakewood, CO (US); Janna Martinek, Lafayette, CO (US); Timothy J. Wendelin, Lakewood, CO (US); Mark S. Mehos, Boulder, CO (US); Judy C. Netter, Westminster, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 324 days.

(21) Appl. No.: 15/390,690

(22) Filed: Dec. 26, 2016

(65) Prior Publication Data
US 2017/0184326 A1    Jun. 29, 2017

Related U.S. Application Data

(60) Provisional application No. 62/387,450, filed on Dec. 24, 2015.

(51) Int. Cl.
*F24S 10/55* (2018.01)
*F24S 20/20* (2018.01)
(Continued)

(52) U.S. Cl.
CPC .............. *F24S 10/55* (2018.05); *F24S 20/20* (2018.05); *F24S 70/60* (2018.05); *F24S 80/20* (2018.05); *Y02E 10/41* (2013.01); *Y02E 10/44* (2013.01)

(58) Field of Classification Search
CPC ............ F24S 10/55; F24S 20/20; F24S 70/60
See application file for complete search history.

(56) References Cited

U.S. PATENT DOCUMENTS

| 3,971,211 A | 7/1976 | Wethe et al. |
| 4,026,273 A * | 5/1977 | Parker ................... F24S 23/70 126/649 |

(Continued)

FOREIGN PATENT DOCUMENTS

| DE | 196 32 019 C1 | 11/1997 |
| EP | 0 151 045 A2 | 8/1985 |

(Continued)

OTHER PUBLICATIONS

Con-Tech Systems Ltd., "Introduction to Micropile Design 101: Presentation for Arizona Ram Jack Seminar", Jan. 15, 2010, pp. 1-80.

(Continued)

*Primary Examiner* — David J Laux
(74) *Attorney, Agent, or Firm* — Michael A. McIntyre

(57) ABSTRACT

A device is describe for collecting energy in electromagnetic radiation, where the device includes a first panel that includes a first height, a first end, and a second end such that a first length is defined between the first end and the second end. The device further includes a second panel that includes a second height, a third end, and a fourth end such that a second length is defined between the third end and the fourth end. In addition, the first height and the second height are substantially parallel to a reference axis, the first end and the third end intersect to form a leading edge that is substantially parallel to the reference axis, and the first panel and the second panel form a channel positioned between the first panel and the second panel. Further, the channel is configured for the flow of a first heat-transfer medium through the channel, and at least a part of the first panel and at least a part of the second panel are configured to absorb electromagnetic radiation to transfer energy from the electromagnetic radiation to the first heat-transfer medium.

18 Claims, 20 Drawing Sheets

(51) Int. Cl.
*F24S 80/20* (2018.01)
*F24S 70/60* (2018.01)

(56) References Cited

U.S. PATENT DOCUMENTS

| | | | |
|---|---|---|---|
| 4,030,477 A | 6/1977 | Smith | |
| 4,047,517 A * | 9/1977 | Arnberg | F24S 20/20 |
| | | | 126/679 |
| 4,116,222 A | 9/1978 | Seifried | |
| 4,117,829 A | 10/1978 | Gross et al. | |
| 4,118,934 A | 10/1978 | Brola | |
| 4,164,123 A | 8/1979 | Smith | |
| 4,209,236 A | 6/1980 | Horton et al. | |
| 4,215,553 A | 8/1980 | Poirier et al. | |
| 4,248,211 A * | 2/1981 | Womack | F24S 23/71 |
| | | | 126/658 |
| 4,287,881 A | 9/1981 | Palazzetti et al. | |
| 4,314,549 A | 2/1982 | Swanson | |
| 4,333,445 A | 6/1982 | Lee | |
| 4,358,930 A | 11/1982 | Pope et al. | |
| 4,582,590 A | 4/1986 | Qader | |
| 5,245,986 A | 9/1993 | Karni | |
| 5,947,114 A | 9/1999 | Kribus et al. | |
| 6,598,398 B2 | 7/2003 | Viteri et al. | |
| 6,622,470 B2 | 9/2003 | Viteri et al. | |
| 6,824,710 B2 | 11/2004 | Viteri et al. | |
| 6,910,335 B2 | 6/2005 | Viteri et al. | |
| 7,211,906 B2 | 5/2007 | Teets et al. | |
| 7,219,677 B1 | 5/2007 | Jackson | |
| 7,331,178 B2 | 2/2008 | Goldman | |
| 7,685,820 B2 | 3/2010 | Litwin et al. | |
| 7,690,377 B2 | 4/2010 | Goldman et al. | |
| 7,845,172 B2 | 12/2010 | Goldman | |
| 7,954,321 B2 | 6/2011 | Shinnar | |
| 7,987,844 B2 | 8/2011 | Zillmer et al. | |
| 8,033,110 B2 | 10/2011 | Gilon et al. | |
| 8,084,280 B2 | 12/2011 | Kashkoush et al. | |
| 8,109,265 B1 | 2/2012 | Kolb | |
| 8,240,051 B2 | 8/2012 | Fedock et al. | |
| 8,356,591 B2 * | 1/2013 | Plotkin | F24S 10/742 |
| | | | 126/704 |
| 8,490,618 B2 | 7/2013 | Kroizer et al. | |
| 9,127,857 B2 | 9/2015 | Albrecht et al. | |
| 9,200,622 B2 | 12/2015 | Sakadjian et al. | |
| 9,347,690 B2 | 5/2016 | Ma | |
| 2004/0244376 A1 | 12/2004 | Litwin et al. | |
| 2005/0026170 A1 | 2/2005 | Patti et al. | |
| 2007/0157614 A1 | 7/2007 | Goldman | |
| 2008/0000231 A1 | 1/2008 | Litwin et al. | |
| 2009/0038608 A1 | 2/2009 | Caldwell | |
| 2009/0064994 A1 | 3/2009 | Weatherby et al. | |
| 2009/0173337 A1 | 7/2009 | Tamaura et al. | |
| 2009/0194097 A1 | 8/2009 | Rabinoff | |
| 2009/0313995 A1 | 12/2009 | Zakrzewski | |
| 2010/0006087 A1 | 1/2010 | Gilon et al. | |
| 2010/0101563 A1 * | 4/2010 | Fischer | F24S 10/55 |
| | | | 126/651 |
| 2010/0303692 A1 | 12/2010 | Perkins et al. | |
| 2011/0000515 A1 | 1/2011 | Patwardhan et al. | |
| 2011/0067398 A1 | 3/2011 | Slocum et al. | |
| 2011/0067690 A1 | 3/2011 | Slocum et al. | |
| 2011/0100796 A1 | 5/2011 | Ma et al. | |
| 2011/0120669 A1 | 5/2011 | Hunt | |
| 2011/0209475 A1 | 9/2011 | Jeter et al. | |
| 2011/0239651 A1 | 10/2011 | Aoyama et al. | |
| 2011/0259544 A1 | 10/2011 | Neti et al. | |
| 2011/0283700 A1 | 11/2011 | Zohar et al. | |
| 2011/0303269 A1 | 12/2011 | Kim et al. | |
| 2011/0314813 A1 | 12/2011 | Cafri et al. | |
| 2012/0085341 A1 | 4/2012 | Britland | |
| 2012/0216536 A1 | 8/2012 | Ma et al. | |
| 2012/0216537 A1 | 8/2012 | Fitch | |
| 2012/0234311 A1 | 9/2012 | Johnson et al. | |
| 2012/0247134 A1 | 10/2012 | Gurin | |
| 2012/0266867 A1 | 10/2012 | Citti et al. | |
| 2012/0312294 A1 * | 12/2012 | Grindatto | F28F 1/40 |
| | | | 126/651 |
| 2013/0118145 A1 | 5/2013 | Palmer et al. | |
| 2013/0118477 A1 | 5/2013 | Albrecht et al. | |
| 2013/0118480 A1 | 5/2013 | Kraft et al. | |
| 2013/0118481 A1 | 5/2013 | Wasyluk et al. | |
| 2013/0192586 A1 | 8/2013 | Wasyluk et al. | |
| 2013/0228163 A1 | 9/2013 | Wait | |
| 2013/0255667 A1 | 10/2013 | Ma et al. | |
| 2013/0284163 A1 | 10/2013 | Flamant et al. | |
| 2014/0123646 A1 | 5/2014 | Muren et al. | |
| 2014/0157776 A1 | 6/2014 | Freund et al. | |
| 2014/0298822 A1 | 10/2014 | Ma | |
| 2014/0311479 A1 | 10/2014 | Maryamchik et al. | |
| 2015/0020793 A1 | 1/2015 | Llorente Folch | |
| 2015/0300692 A1 | 10/2015 | Wasyluk | |
| 2015/0316328 A1 | 11/2015 | Trainham et al. | |
| 2015/0330667 A1 | 11/2015 | Wasyluk | |
| 2015/0330668 A1 | 11/2015 | Wagner et al. | |
| 2018/0195768 A1 | 7/2018 | Wagner et al. | |

FOREIGN PATENT DOCUMENTS

| | | |
|---|---|---|
| EP | 1 930 587 A2 | 6/2008 |
| EP | 2 653 801 B1 | 6/2014 |
| JP | 2011-017449 | 1/2011 |
| WO | WO 2009/153143 A1 | 12/2009 |
| WO | WO 2010/029411 A2 | 3/2010 |
| WO | WO 2010/144554 A1 | 12/2010 |
| WO | WO 2013/071069 A2 | 5/2013 |
| WO | WO 2013/181712 A1 | 12/2013 |
| WO | WO 2014/026703 A1 | 2/2014 |

OTHER PUBLICATIONS

Foster Wheeler AG, "Circulating Fluidized-Bed (CFB) Steam Generators", http://www.fwc.com/GlobalPowerGroup/SteamGenerators/CirculatingFluidizedBed.cfm, last accessed Apr. 1, 2013, p. 1.

Agrafiotis et al., "Evaluation of Porous Silicon Carbide Monolithic Honeycombs as Volumetric Receivers/Collectors of Concentrated Solar Radiation", Solar Energy Materials and Solar Cells, 2007, vol. 91, pp. 474-488.

Ávila-Marín, "Volumetric Receivers in Solar Thermal Power Plants with Central Receiver System Technology: A Review", Solar Energy, 2011, vol. 85, pp. 891-910.

Chacartegui et al., "Alternative Cycles Based on Carbon Dioxide for Central Receiver Solar Power Plants", Applied Thermal Engineering, 2011, vol. 31, pp. 872-879.

Chacartegui et al., "Analysis of Intermediate Temperature Combined Cycles with a Carbon Dioxide Topping Cycle", Proceedings of ASME Turbo Expo 2008: Power for Land, Sea and Air GT2008-51053, Jun. 2008, Berlin, Germany, pp. 673-680.

Chapman et al., "An Assessment of the Supercritical Carbon Dioxide Cycle for Use in a Solar Parabolic Trough Power Plant", Proceedings of SCCO$_2$ Power Cycle Symposium 2009, Apr. 2009, Troy, NY, pp. 1-5.

Christian et al., "CFD Simulation and Heat Loss Analysis of the Solar Two Power Tower Receiver", Proceedings of the ASME 2012 6th International Conference on Energy Sustainability, ES2012-91030, Jul. 2012, San Diego, CA, pp. 1-9.

Dostal et al., "High-Performance Supercritical Carbon Dioxide Cycle for Next-Generation Nuclear Reactors", Nuclear Technology, Jun. 2006, vol. 154, pp. 265-282.

Dostal et al., "The Supercritical Carbon Dioxide Power Cycle: Comparison to Other Advanced Power Cycles", Nuclear Technology, Jun. 2006, vol. 154, pp. 283-301.

Falcone et al., "Assessment of a Solid Particle Receiver for a High Temperature Solar Central Receiver System", Sandia National Laboratories—Report, SAND85-8208, Feb. 1985, pp. 1-91.

Fuller et al., "Practical Considerations in Scaling Supercritical Carbon Dioxide Closed Brayton Cycle Power Systems", Proceedings of SCCO$_2$ Power Cycle Symposium, Apr. 2009, Troy, NY, pp. 1-7.

(56) References Cited

OTHER PUBLICATIONS

Gil et al., "State of the Art on High Temperature Thermal Energy Storage for Power Generation Part 1—Concepts, Materials and Modellization", Renewable and Sustainable Energy Reviews, 2010, vol. 14, pp. 31-55.

Golob et al., "Heat Transfer Coefficient Between Flat Surface and Sand", Proceedings of the ASME 2011 5th International Conference on Energy Sustainability ES2011-54438, Aug. 2011. Washington D.C., pp. 1-10.

Hischier et al., "A Modular Ceramic Cavity-Receiver for High-Temperature High-Concentration Solar Applications", Journal of Solar Energy Engineering, Feb. 2012, vol. 134, pp. 011004-1-011004-6.

Ho et al., "Review of High-Temperature Central Receiver Designs for Concentrating Solar Power", Renewable and Sustainable Energy Reviews, 2014, vol. 29, pp. 835-846.

Kim et al., "A Study of Solid Particle Flow Characterization in Solar Particle Receiver", Solar Energy, 2009, vol. 83, pp. 1784-1793.

Kolb, "An Evaluation of Possible Next-Generation High Temperature Molten-Salt Power Towers", Sandia Report SAND2011-9320, Dec. 2011, pp. 1-121.

Kunii et al., "Heat Transfer Between Fluidized Beds and Surfaces" *Fluidization Engineering*—Second Edition, 1991, Butterworth-Heinemann, Chapter 13, pp. 313-323.

Ma et al., "Advanced Supercritical Carbon Dioxide Power Cycle Configurations for Use in Concentrating Solar Power Systems", Supercritical $CO_2$ Power Cycle Symposium, Boulder, CO, May 2011, pp. 1-5.

Ma et al., "Thermal Energy Storage and its Potential Applications in Solar Thermal Power Plants and Electricity Storage", Proceedings of the ASME 2011 5th International Conference on Energy Sustainability ES2011-54077, Washington D.C., Aug. 2011, pp. 1-10.

Martín et al., "ASCUAS: A Solar Central Receiver Utilizing a Solid Thermal Carrier", SAND82-8203, Jan. 1982, pp. 1-30.

Moisseytsev et al., "Performance Improvement Options for the Supercritical Carbon Dioxide Brayton Cycle", Jun. 6, 2007, Argonne National Laboratory, ANL-GenIV-103, pp. 1-52.

Neber et al., "Enhanced Solar Energy Harvest for Power Generation from Brayton Cycle", Proceedings of the ASME 2011 International Mechanical Engineering Congress & Exposition IMECE2011-62890, Nov. 2011, pp. 1-4.

Röger et al., "Face-Down Solid Particle Receiver Using Recirculation", Journal of Solar Energy Engineering, Aug. 2011, vol. 133, pp. 031009-1-031009-8.

Ruiz et al., "An Exergy-Based Metric for Evaluating Solar Thermal Absorber Technologies for Gas Heating", Proceedings of the ASME/JSME 2011 8th Thermal Engineering Joint Conference, Honolulu, Hawaii, Mar. 2011, pp. 1-9.

Siegel et al., "Design and On-Sun Testing of a Solid Particle Receiver Prototype", Proceedings of ES2008 (Energy Sustainability 2008) ES2008-54090, Aug. 2008, Jacksonville, FL, pp. 1-6.

Siegel et al., "Development and Evaluation of a Prototype Solid Particle Receiver: On-Sun Testing and Model Validation", Journal of Solar Energy Engineering, May 2010, vol. 132, pp. 021008-1-021008-8.

Siegel et al., *Thermal Radiation Heat Transfer*, Third Edition, Hemisphere Publishing Corporation, 1992, pp. 292-297.

Teichel et al., "General Calculation of Semi-Gray Radiation Heat Transfer in Solar Central Cavity Receivers", Proceedings of SOLARPACES 2011, Granada, Spain, Sep. 2011, pp. 1-8.

Turchi, "Supercritical $CO_2$ for Application in Concentrating Solar Power Systems", Proceedings of $SCCO_2$ Power Cycle Symposium 2009, Troy, NY, Apr. 2009, pp. 1-5.

Wagner, "Simulation and Predictive Performance Modeling of Utility-Scale Central Receiver System Power Plants", Master of Science—Mechanical Engineering Thesis, University of Wisconsin—Madison, 2008, pp. 1-45.

Wright et al., "Operation and Analysis of a Supercritical $CO_2$ Brayton Cycle", Sandia National Laboratories, Sandia Report SAND2010-0171, Sep. 2010, pp. 1-101.

Wu et al., "Direct Absorption Receivers for High Temperatures", SolarPaces 2011, http://elib.dlr.de/73113/1/SolarPACES2011_WU_DLR.pdf, Sep. 2011, last accessed on Feb. 2, 2017, pp. 1-8.

* cited by examiner

RECEIVERS FOR CONCENTRATING SOLAR POWER GENERATION

CROSS-REFERENCE TO RELATED APPLICATIONS

This application claims priority to U.S. Provisional Application No. 62/387,540, filed Dec. 24, 2015, the contents of which are incorporated herein by reference in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Concentrating solar power (CSP) is an effective way to convert solar energy into electricity with an economic energy-storage capability for grid-scale, dispatchable renewable power generation. CSP plants need to reduce costs to be competitive with other power generation methods. Two ways to reduce CSP cost are to increase solar-to-electric efficiency by supporting a high-efficiency power conversion system, and to use low-cost materials in the system. The state-of-the-art molten-salt systems have limited potential for cost reduction and improving power-conversion efficiency with high operating temperatures. Even with significant improvements in operating performance, these systems face challenges in satisfying the cost and performance targets.

Unlike a conventional molten-salt based CSP plant, this design uses gas/solid, two-phase flow as the heat-transfer fluid (HTF); separated solid particles as the storage media; and stable, inexpensive materials for the high-temperature energy storage containment. A key enabling technology for the solid-particle based CSP system is a high-temperature, high-efficient particle receiver. Achieving high temperatures and desired particle flow-rate is a challenge with current systems under development using open- or rotating-cavity designs. Open-cavity receivers have several potential concerns affecting the receiver performance: (1) particle trajectories are affected by wind, (2) falling particles can entrain cold air through the cavity opening, (3) solar flux passes through the particle stream and heats up the receiver's back wall, and (4) the freely falling particles may not have adequate residence time in the heating region. Thus, there remains a need for improved CSP systems and solar receivers.

SUMMARY

An aspect of the present disclosure is a device that includes a first panel that includes a first height, a first end, and a second end such that a first length is defined between the first end and the second end. The device further includes a second panel that includes a second height, a third end, and a fourth end such that a second length is defined between the third end and the fourth end. In addition, the first height and the second height are substantially parallel to a reference axis, the first end and the third end intersect to form a leading edge that is substantially parallel to the reference axis, and the first panel and the second panel form a channel positioned between the first panel and the second panel. Further, the channel is configured for the flow of a first heat-transfer medium through the channel, and at least a part of the first panel and at least a part of the second panel are configured to absorb electromagnetic radiation to transfer energy from the electromagnetic radiation to the first heat-transfer medium.

In some embodiments of the present disclosure, the first panel and the second panel may intersect to form a first angle that is between about 5° and about 60° at the leading edge. In some embodiments of the present disclosure, the first length may be substantially equal to the second length. In some embodiments of the present disclosure, the first panel may further include a first bend that is substantially parallel to the leading edge such that the first bend creates a first portion of the first panel and a second portion of the first panel, where the first portion includes the leading edge, the second portion is adjacent to the first portion, and the first bend defines a first width between the first panel and the second panel. In some embodiments of the present disclosure, the first panel may further include a second bend that is substantially parallel to the leading edge such that the second bend creates a third portion of the first panel, the third portion is adjacent to the second portion and includes the second end, the second bend defines a second width between the first panel and the second panel, and the second width is larger than or equal to the first width. In some embodiments of the present disclosure, the first width may have a value between about 0.05 meters and about 0.5 meters.

In some embodiments of the present disclosure, the second panel may further include a third bend that is substantially parallel to the leading edge such that the third bend creates a first portion of the second panel and a second portion of the second panel, the first portion of the second panel includes the leading edge, and the second portion of the second panel is adjacent to the first portion. In some embodiments of the present disclosure, the second panel may further include a fourth bend that is substantially parallel to the leading edge such that the fourth bend creates a third portion of the second panel, and the third portion of the second panel is adjacent to the second portion of the second panel and includes the fourth end. In some embodiments of the present disclosure, the first portion of the first panel and the first portion of the second panel may have a reflective surface. In some embodiments of the present disclosure, the second portion and the third portion of the first panel, and the second portion and the third portion of the second panel may have a light-absorbing surface.

In some embodiments of the present disclosure, a second heat-transfer medium may be configured to flow between the first portion of the first panel and the first portion of the second panel. In some embodiments of the present disclosure, the second heat-transfer medium may include at least one of a cooling fluid and/or a phase-change material. In some embodiments of the present disclosure, the first length may be about equal to the second length and may have a value between about 0.02 meters and about 0.6 meters. In some embodiments of the present disclosure, the second panel may be substantially a mirror-image of the first panel.

In some embodiments of the present disclosure, the device may further include a third panel that may include a third height, a fifth end, and a sixth end, such that a third length is defined between the fifth end and the sixth end, where the third height is substantially parallel to the reference axis, the second end and the sixth end intersect to form an apex that is substantially parallel to the reference axis, the first end and the fifth end form an aperture configured to receive the electromagnetic radiation through the aperture, the first panel and the third panel form a passage positioned between the first panel and the third panel, and at least a portion of the third panel is configured to absorb at least a portion the electromagnetic radiation to transfer energy from the electromagnetic radiation to the first heat-transfer medium. In some embodiments of the present disclosure, the device may further include a gas supply header positioned within the channel configured to supply a gas. In some embodiments of the present disclosure, the device may further include a baffle positioned within the channel. In some embodiments of the present disclosure, the device may further include a control valve positioned at at least one of an inlet to the channel or an outlet from the channel.

An aspect of the present disclosure is a method for collecting electromagnetic radiation, where the method includes directing the electromagnetic radiation towards a receiver. The receiver includes a first divider that includes a first panel having a first portion and a second portion, and a second panel having a third portion and a fourth portion, where the first portion and the third portion intersect to form a first leading edge, and the first panel and the second panel form a first channel positioned between the first panel and the second panel. In addition, the receiver includes a second divider having a third panel that includes a fifth portion and a sixth portion, and a fourth panel that includes a seventh portion and an eighth portion, where the fifth portion and the seventh portion intersect to form a second leading edge, and the third panel and the fourth panel form a second channel positioned between the third panel and the fourth panel, the second portion and the sixth portion intersect to form an apex, the first panel and the third panel form a passage positioned between the first panel and the third panel, and the first leading edge and the second leading edge form an aperture. The method also includes receiving at least a first portion of the electromagnetic radiation through the aperture, reflecting into the passage at least a first portion of the electromagnetic radiation from at least one of the first leading edge, the second leading edge, the first portion, the third portion, the fifth portion, or the sixth portion, absorbing at least a second portion of the electromagnetic radiation by at least one of the apex, the second portion, the fourth portion, the sixth portion, or the eighth portion, and transferring at least a third portion of the electromagnetic radiation to a heat-transfer medium flowing through at least one of the first channel or the second channel. In some embodiments of the present disclosure, the directing may be performed by a heliostat field.

BRIEF DESCRIPTION OF THE DRAWINGS

Some embodiments are illustrated in referenced figures of the drawings. It is intended that the embodiments and figures disclosed herein are to be considered illustrative rather than limiting.

REFERENCE NUMBERS

Figure 1:
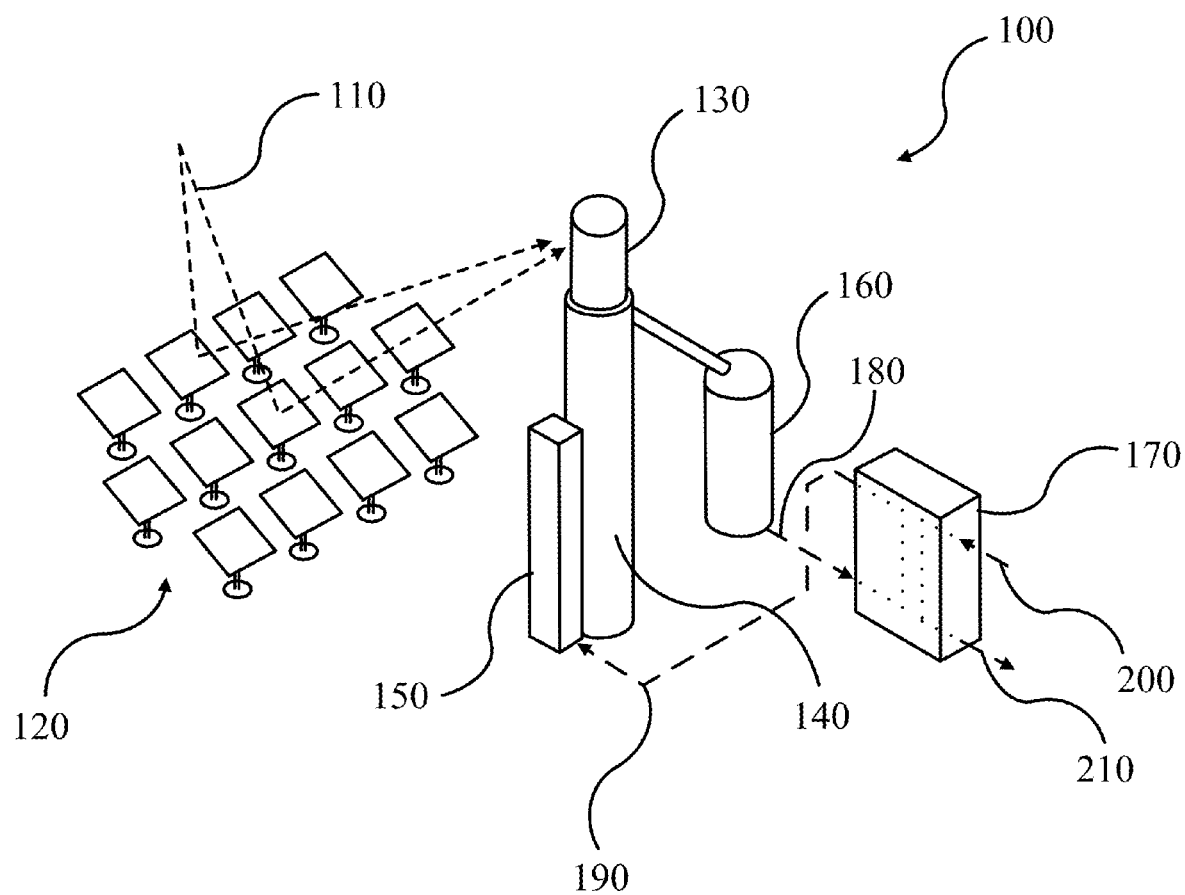
FIG. 1 illustrates a concentrating solar power plant, according to some embodiments of the present disclosure.

100 . . . concentrating solar power plant
110 . . . light
120 . . . heliostat field
130 . . . receiver
140 . . . receiver tower and cold silo
150 . . . particle transporter
160 . . . hot silo
170 . . . heat exchanger
180 . . . high temperature particle stream
190 . . . low temperature particle stream
200 . . . low temperature working fluid stream
210 . . . high temperature working fluid stream
220 . . . aperture
230 . . . leading edge
240 . . . divider
242 . . . first panel
244 . . . second panel
246 . . . first bend
248 . . . second bend
250 . . . passage
251 . . . apex
252 . . . first portion of passage
254 . . . second portion of passage
256 . . . third portion of passage
260 . . . channel
262 . . . first portion of channel
264 . . . second portion of channel
266 . . . third portion of channel
268 . . . wall
270 . . . cooling channel 280 . . . extender/conduit
290 . . . sub-channel
300 . . . baffle
310 . . . gas supply header
320 . . . gas distribution header
330 . . . fluidizing gas line
340 . . . mechanical support
350 . . . gas return header
360 . . . gas exhaust orifice
900 . . . control valve
910 . . . inlet
920 . . . outlet

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein. As used herein the term "substantially" refers to variation around a single numeric value, where the variation is ±5% of the single numeric value. Some of the embodiments described herein relate to CSP receivers having unique geometries, unique divider shapes to serve the optical mechanism for solar flux spreading over a panel wall, and using gas/solid two-phase fluidization with flow control means for enhanced heat transfer. As used herein a "panel" refers to a flat and/or curved planar structure having a height dimension, a length dimension, and a thickness dimension. Thus, a panel may have a significantly rectangular shape or a square shape. A panel may have any desirable aspect ratio, defined as the height dimension divided by the length dimension. In some examples, an aspect ratio may be between 10,000 and 1.

FIG. 1 illustrates some components of an example of a concentrating solar power plant 100 that utilizes a heliostat field 120 to receive and concentrate light 110 (e.g. electromagnetic radiation) onto a receiver 130 positioned on a receiver tower 140. At least a portion of the energy contained in the light 110 reflected from the heliostat field 120 to the receiver 130 may be transferred to a heat-transfer medium, which may be a solid particle medium or a fluid medium (e.g. gas, liquid, and/or supercritical fluids). In some embodiments of the present disclosure, the receiver tower 140 may serve as a storage silo for low temperature solid particles, as well as a tower for placing a receiver 130 at a suitable elevation for receiving light 110 from the heliostat field. A particle transporter 150 may transport the low temperature particles from storage, in this case from the receiver tower/cold silo 140, to the receiver 130 positioned at the top of the receiver tower/cold silo 140, where energy from the light 110 may be transferred to the low temperature solid particles flowing through the receiver 130 to create high temperature particles. The heated solid particles may then be transported to a hot silo 160 for storage. The hot silo 160 may provide a surge volume, which enables the control/regulation of the flow of a high temperature solid particle stream 180 to heat exchanger 170. The heat exchanger 170 may transfer energy from the high temperature particle stream 180 to a low temperature working fluid stream 200 (e.g. water) to create a high temperature working fluid stream 210, which may then be used to drive a turbine (not shown) to generate electricity. The energy transfer in the heat exchanger 170 may also result in a low temperature particle stream 190, which may then be recycled back to the receiver tower/cold silo 140 for storage from which it may be directed back to the receiver 130 to begin the heat-transfer cycle again.

Figure 2A:
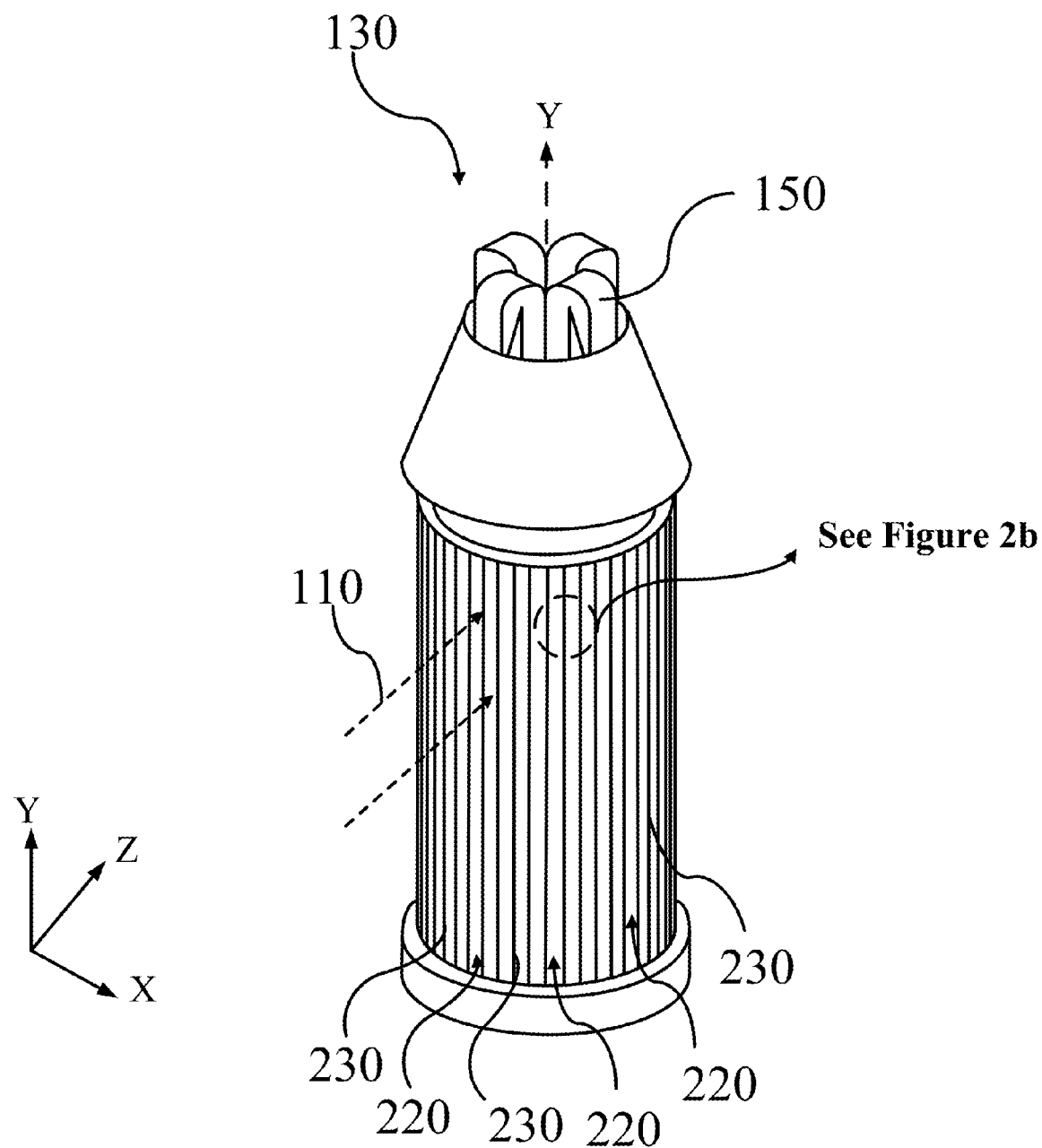
FIG. 2A and FIG. 2B illustrate a receiver and design features of such a receiver, according to some embodiments of the present disclosure.
Figure 2B:
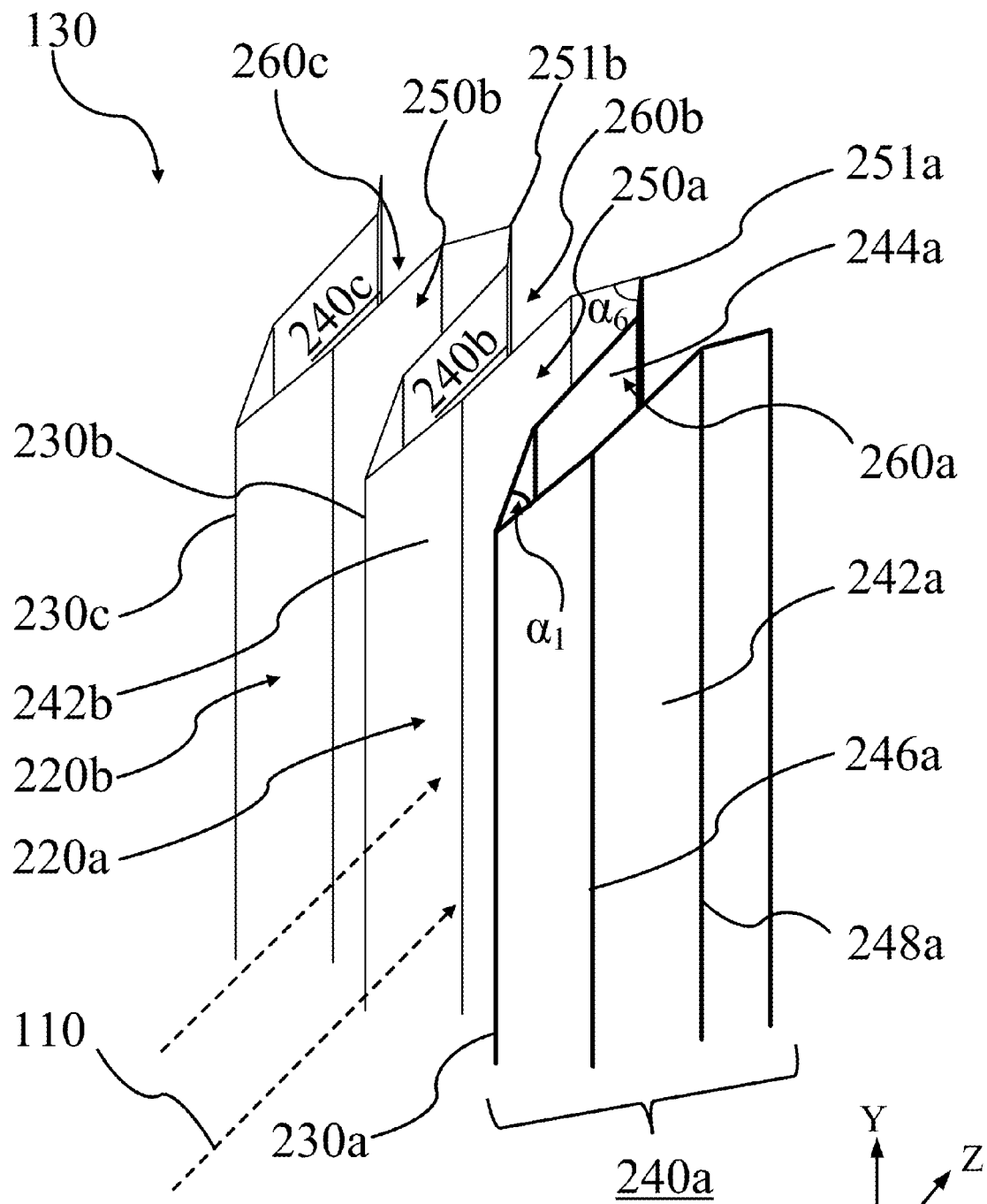

FIG. 2A and FIG. 2B illustrate perspective views of a receiver 130 for receiving light 110 from a heliostat field (not shown) and for transferring at least a portion of the energy contained within the light 110 to a heat-transfer medium, for example solid particles, flowing through the receiver 130, according to some embodiments of the present disclosure. This example of a receiver 130 has an open cavity that passes through the center of the receiver 130, relative to the receiver's long axis (Y). A particle transporter 150 may be positioned concentrically within this cavity, configured to transport low temperature particles from storage to a plurality of heat-transfer medium channels 260 (see FIG. 2B) positioned around the outer edge and circumference of the receiver 130. Thus, as shown in FIG. 2A, the receiver 130 includes a plurality of vertically aligned (relative to the Y-axis) leading edges 230 that create a plurality of vertically aligned apertures 220 positioned to receive light 110 from the heliostat field (not shown). Each leading edge 230 is an element of a divider 240, with each divider 240 constructed of a first panel 242 and a second panel 244 such that each pair of panels (242 and 244) for a given divider 240 create an internal channel, a heat-transfer medium channel 260 configured for the flow of solid particles there through. Thus, each divider 240 has a first panel 242 and a second panel 244 defining a space between the two panels to create the channel 260. Further, the placement of a plurality of dividers next to each other, around the circumference of the receiver 130, form both a plurality of apertures 220 (defined by neighboring leading edges 230), and a plurality of light-receiving passages 250, also defined by adjacent/neighboring panels (242 and 244) of adjacent/neighboring dividers 240.

FIG. 2B illustrates that the spatial orientation and arrangement of the panels (242 and 244) determine the orientation and structure of the dividers 240, the heat-transfer receiving channels 260, the apertures 230, and the light-receiving passages 250. In the example of FIG. 2B, the panels (242 and 244) are positioned with their height dimension substantially parallel to the long axis (Y) of the receiver 130. Thus, the receiver 130 in this example includes a plurality of dividers 240, each having a first panel 242 and a second panel 244, with the height dimension of each panel (242 and 244) positioned substantially parallel to the long axis (Y) of the receiver 130 and around the outer circumference of the receiver 130, and the length dimension of each panel 244 positioned substantially perpendicular to the long axis (Y) of the receiver 130. In addition, a first end of each first panel 242 and a first end of each second panel 244 of each divider 240 may intersect to form a leading edge 230, where each leading edge 230 may be directed outwardly, away from the center of the receiver 130 and towards the incoming light 110. As the incoming light 110 may impinge directly on the leading edges 230 of the dividers 240, resulting in overheating, the leading edges 230 may be configured to minimize amount of light 110 directly impinging on the leading edges 230. Thus, the first panel 242 and the second panel 244 of a divider 240 may intersect to form a sharp leading edge 230 with minimum surface area exposure to the light 110. Thus, the leading edge 230 of a panel (e.g. 242 and 244) may be positioned to be substantially parallel with the height dimension of the panels (e.g. 242 and 244), in the case of FIG. 2A and FIG. 2B substantially parallel with the long axis of the receiver 130 or the Y-axis.

The first panel 242 and the second panel 244 of a divider 240 may intersect to form a relatively small angle, $\alpha_1$, between the first panel 242 and the second panel 244; e.g. an angle of less than about 90 degrees. In some embodiments of the present disclosure, the angle $\alpha_1$ may be less than about 60 degrees. In further embodiments of the present disclosure, the angle $\alpha_1$ may be less than about 30 degrees. In still further embodiments, the angle $\alpha_1$ may be about 30 degrees. The shape of a sharp leading edge 230 followed by a sloped surface that forms a heat shield in the front of the receiver provides protection for the front area of the receiver 130 from high heat loss. The sharp leading edge 230 minimizes reflection of the incident flux back to the environment compared to a flat front surface rounded face. The sloped faces following the sharp leading edge 230 may reflect a portion of the solar flux into the passage 250 of the divider 240 to be absorbed by the heat transfer media, instead of losing this energy to the environment. A rounded leading edge 230b may be applied when providing a cooling liquid to the leading edge. Another embodiment for a rounded leading edge 230b design may include particle flow through a transparent tube, constructed for example of a quartz material, to absorb heat directly from the incident solar flux.

FIG. 2B also illustrates that a panel (242 and/or 244) may include at least one bend (two shown; 246 and 248) such that a panel (242 and/or 244) may have two or more portions, where at least one portion of a panel (242 and/or 244) may be substantially parallel to the long axis (Y) of the receiver 130, and thus, substantially parallel to the leading edge 230 of the panels (e.g. 242 and/or 244). Thus, the length dimensions of the panel portions resulting from the bends (246 and/or 248) may be oriented at different angles relative to a reference axis (Z) that is substantially perpendicular to the long axis (Y) of the receiver 130 and the leading edge(s) 230. The two or more bends (not limited to two) design was developed from an understanding of how a heliostat field interacts with the planar cavity receiver and an understanding of solar flux beam concentrating properties. The shape of the divider (including bend number and contour geometry) may be adapted to the heliostat layout and concentrating beam characteristics. In particular, a divider design may be optimized to obtain a uniform flux distribution on the divider panels to obtain a uniform temperature distribution, eliminating hot spots, and resulting in improved thermal performance and mechanical reliability. An optical characteristic that may be used for divider design is based on the observation that the light from a heliostat field, aimed at the center-line of a receiver, contains two light components: a collimated component that is substantially parallel to the long axis of the divider (e.g. the length dimension of a panel), and a diffuse component that is fanned out relative to the long axis of the divider. The second portions of the channels of the dividers shown in FIGS. 2-4 primarily collect the diffuse light component, and the rear angled sections intercept the collimated component. These designs enable the adjustable spreading of the incoming light to the various panel portions and shape optimization to achieve nearly uniform distribution of incoming light onto the light-receiving surfaces of the panels. The end result is optimized heat transfer to the heat-transfer medium (e.g. solid particles) and improved receiver performance. As shown in FIG. 2B, panels may be tapered to smoothly spread the concentrated solar flux along the panels, where the distributed heat flux may be managed to match the wall-to-particle heat transfer.

FIGS. 2A and 2B illustrate that each divider 240 may be positioned to be in physical contact with at least one of its neighboring dividers. In some embodiments, as shown in FIG. 2B, each divider may be in physical contact with a first neighboring divider on one of its sides, and in physical contact with a second neighboring divider on an opposite side. Three dividers (240a-c) are shown in FIG. 2B, with a first divider 240a and its associated elements illustrated in darker bold lines. FIG. 2B illustrates the first divider 240a in physical contact with neighboring second divider 240b. Thus, the second divider 240b, is positioned between the first divider 240a and a third divider 240c. As shown in FIG. 2B, the first divider 240a is physically attached to second divider 240b by connecting a second end of the second panel 244a of first divider 240a to the second end of the first panel 242b of second divider 240b to form a first apex 251a within a first light-receiving passage 250a. FIG. 2B also illustrates a second apex 251b and a second passage 250b formed by joining second divider 240b to third divider 240c. Thus, each apex (251a and 251b) is formed by the intersection of two neighboring panels (242 and 244) to form angle, $\alpha_6$.

Positioning and aligning neighboring dividers (240a-c) results in the formation and physical alignment of corresponding light-receiving passages (250a and 250b) and apexes (251a and 251b) that terminate their corresponding passages (250a and 250b). As shown in FIG. 2B, each light-receiving passage (250a and 250b) begins with an outwardly facing aperture (220a and 220b) through which light 110 from the external environment (e.g. heliostat field) passes into each corresponding passage (250a and 250b) where the light is absorbed and/or reflected by the surfaces of the panels (242 and 244). The deepest portions of each passage (250a and 250b), as defined by the alignment of the panels (242 and 244), may gradually restrict until the passage (250a and 250b) terminates at its respective apex (251a and 251b). This configuration maximizes the reflectance and absorption of light 110 within the passages (250a and 250b) and results in superior heat-spreading, more uniform temperature gradients on the surfaces of the panels (242 and 244), and reduced hot-spot and/or cold-spot formation. In addition, each apex (251a and 251b) of each light-receiving passage (250a and 250b) may be in thermal communication with the heat-transfer medium (e.g. solid particulate/particles) flowing through the corresponding heat-transfer channels (260a-c), thus reducing heat build-up in the apexes (251a and 251b) and/or the surfaces surrounding the apexes. Taken together, the receiver's plurality of panels (242 and 244) and apexes (251) increase the transfer of energy from the entering light 110 to the heat-transfer medium flowing through the plurality of channels 260, while also reducing the formation of cold spots and/or hot spots on surfaces of the panels (242 and 244).

Figure 3:
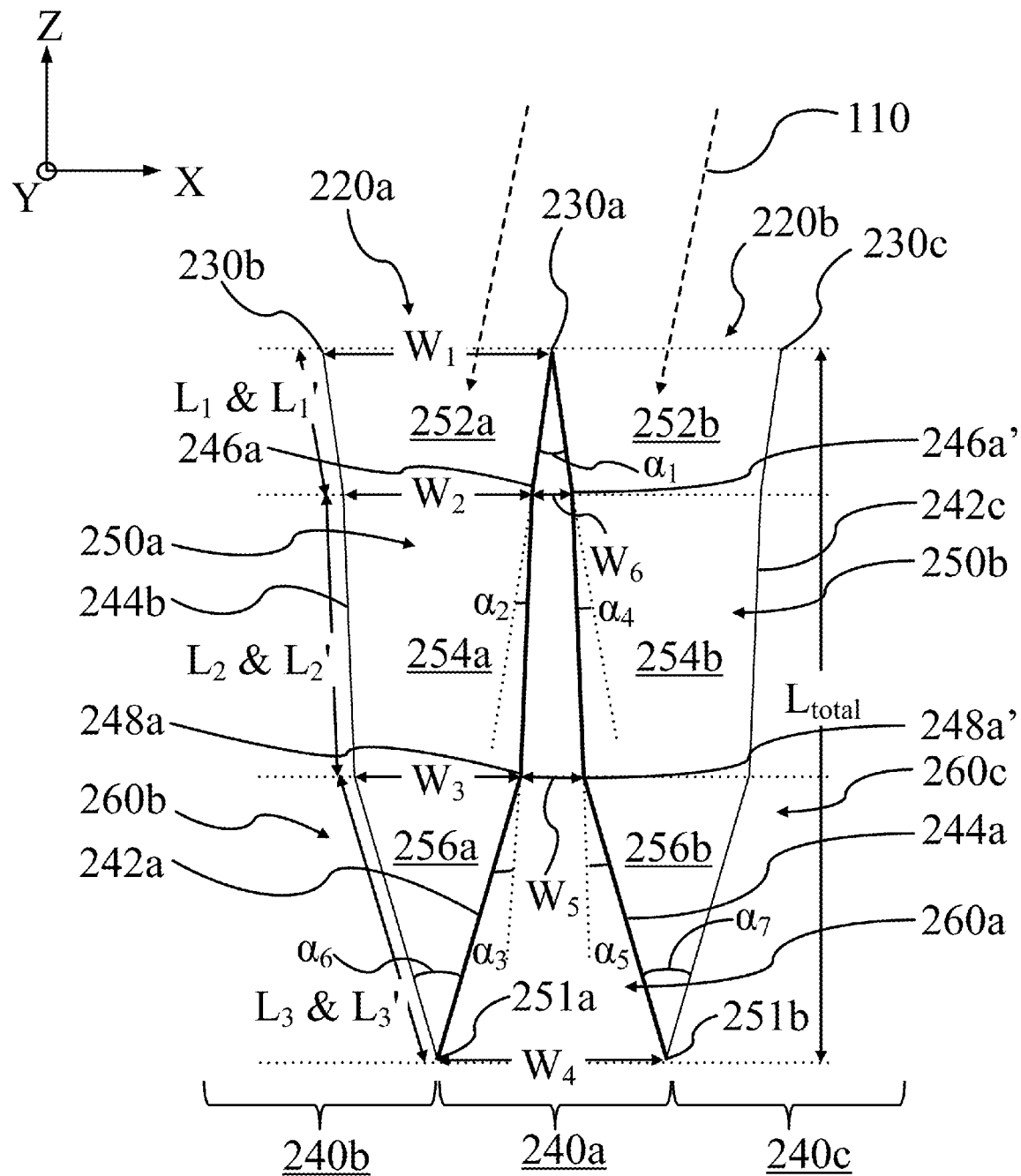
FIG. 3 illustrates receiver dividers, light-receiving passages, and heat-transfer channels, according to some embodiments of the present disclosure.

FIG. 3 illustrates cross-sectional views of dividers similar to the dividers illustrated in FIG. 2B, according to some embodiments of the present disclosure. FIG. 3 focuses on some of the design parameters used to define the geometric shape of the dividers and their corresponding, channels, and passages. The elements of a first divider 240a are highlighted with darker bold lines. The first divider 240a is flanked by and physically connected to two neighboring dividers (second divider 240b and third divider 240c; only one panel of each of these are shown, each having two bends), according to some embodiments of the present disclosure. As shown, the central divider 240a may have a first panel 242a having a height dimension positioned substantially parallel to reference axis Y (e.g. the long axis of the receiver) and a second panel 244a, also with its height dimension positioned substantially parallel to reference axis Y. Both panels (242a and 244a) have a first end and a second end, each pair of ends defining a length dimension that is perpendicular to the Y-axis. The first panel 242a and the second panel 244a are positioned apart from one another (with a space/gap between) and connected at their respective first ends, resulting in the formation of leading edge 230a and channel 260a. As described above, channel 260a (and the other channels of the receiver) is configured for the flow of a heat-transfer medium there through. The leading edge 230a may be directly impinged upon by the incoming light 110, which may result in overheating of the leading edge 230a and the surfaces surrounding the leading edge 230a. To minimize the amount of energy absorbed by the leading edge 230a, e.g. to avoid creating hot spots, the first panel 242a and the second panel 244a of divider 240a may form an angle, $\alpha_1$, that minimizes the surface area directly exposed to the incoming light 110. In some embodiments of the present disclosure, the angle $\alpha_6$ may be about 20 degrees to about 90 degrees, where the specific value depends on the light distribution requirements and heat-transfer needs of the heat-transfer medium.

FIG. 3 illustrates that the first panel 242a of the first divider 240a may have one or more bends, in this example two bends (246a and 248a). Thus, a first bend 246a in the first panel 242a may partition the first panel 242a into a first length, $L_1$, that begins with the first end of the first panel 242a. In addition, the first bend 246a may also define the first boundary of a second length, $L_2$. A second bend 248a may then define the second boundary of the second length, $L_2$, and may further define a third length, $L_3$, that terminates at the second end of the first panel 242a. Similarly, in this example, a second panel 244a of the first divider 240a also has two bends (246a' and 248a'). The first bend 246a' of the second panel 244a may separate the second panel 244a into a first length, $L_1'$, that begins with the first end of the second panel 244a. The first bend 246a' may also define the first boundary of a second length, $L_2'$. The second bend 248a' may then define the second boundary of the second length, $L_2'$, and may further define a third length, $L_3'$, that terminates at the second end of the second panel 244a.

As shown in the example of FIG. 3, the first bend 246a of the first panel 242a is at about the same position in the Z-axis direction as the first bend 246a' of the second panel 244a. As a result, $L_1$ and $L_1'$ may be about the same length. Thus, as in FIG. 3, some embodiments of a divider may have a second panel that is a mirror image of the first panel. This may enable easier construction of the dividers and easier incorporation of the dividers into the receiver structure. A symmetrical arrangement of dividers may provide even heating on the divider panel walls, maximizing the use of divider heat transfer surfaces, although the arrangement may be adjusted based on the incident flux characterization and heat collecting medium flow conditions. However, this arrangement is not necessary. In other examples, the position of the first bend 246a of the first panel 242a may be at a different position in the Z-axis direction than the position of the first bend 246a' of the second panel 244a such that $L_1$ is not equal to $L_1'$. Similarly, the second bend 248a of the first panel 242a may be at a different position in the Z-axis direction than the position of the second bend 248a' of the second panel 244a such that $L_2$ is not equal to $L_2'$ and/or $L_3$ is not equal to $L_3'$. FIG. 3 also shows that in some embodiments the first panel may have the same number of bends as the second panel. However, other embodiments may have dividers where the first panel has a different number of bends than the second panel.

Referring to FIG. 3 again, the first bend 246a of the first panel 242a may be described by an angle, $\alpha_2$, which describes the angular off-set of $L_2$ of the first panel 242a from a line (dotted) extending from $L_1$ of the first panel 242a. Similarly, the second bend 248a of the first panel 242a may be described by an angle, $\alpha_3$, which describes the angular off-set of $L_3$ of the first panel 242a from a line (dotted) extending from $L_2$ of the first panel 242a. Similarly, the first bend 246a' of the second panel 244a may be described by an angle, $\alpha_4$, which describes the angular off-set of $L_2'$ of the second panel 244a from a line (dotted) extending from $L_1'$ of the second panel 244a. Similarly, the second bend 248a' of the second panel 244a may be described by an angle, $\alpha_4$, which describes the angular off-set of $L_3'$ of the second panel 244a from a line (dotted) extending from $L_2'$ of the second panel 244a. FIG. 3 illustrates an example where the angles $\alpha_2$ and $\alpha_4$ are approximately equal and the angles $\alpha_3$ and $\alpha_5$ are also approximately equal. However, this is not required. Other embodiments of dividers may have panels with different numbers of bends and/or positioned at different locations relative to the Z-axis and/or with different characteristic angles ($\alpha_2$ through $\alpha_n$). However, for the example of FIG. 3, the second length, $L_2$, of the first panel 242a may be offset from the first length, $L_1$, by an angle of $\alpha_2$ of about 5 degrees to about 45 degrees and the third length, $L_3$, of the first panel 242a may be offset from the second length, $L_2$, by an angle of $\alpha_3$ of about 10 degrees to about 45 degrees. Similarly, for the example of FIG. 3, the second length, $L_2'$, of the second panel 244a may be offset from the first length, $L_1'$, by an angle of $\alpha_4$ of about 5 degrees to about 45 degrees and the third length, $L_3'$, of the second panel 244a may be offset from the second length, $L_2'$, by an angle of $\alpha_5$ of about 10 degrees to about 45 degrees.

In addition, the first divider 240a of FIG. 3 may be characterized by a number of widths. Specifically, for the case where the second panel 244a is substantially the mirror image of the first panel 242a, the first bend 246a of the first panel 242a may be substantially aligned relative to the Z-axis with the first bend 246a' of the second panel 244a, and the second bend 248a of the first panel 242a may be substantially aligned relative to the Z-axis with the second bend 248a' of the second panel 244a. Thus, the positions relative to the X-axis of the first bend 246a and the first bend 246a' define a first width, $W_6$, within channel 260a. Similarly, the positions of the second bend 248a and the second bend 248a', relative to the X-axis, define a second width, $W_5$, within channel 260a. Finally, the position of the second end of the first panel 242a and the second end of the second panel 244a, relative to the X-axis, define a third width, $W_4$, within channel 260a.

FIG. 3 illustrates that the first panel 242a of the first divider 240a may be physically joined to the second panel 244b of neighboring second panel 240b by attaching the second end of the first panel 242a of divider 240a to the second end of the second panel 244b of divider 240b. Connecting divider 240a to neighboring divider 240b creates light-receiving passage 250a. Thus, light 110 may enter passage 250a through aperture 220a defined by width, $W_1$, the distance between the leading edge 230a of divider 240a and the leading edge 230b of divider 240b. The passage 250a is further defined by the inside surfaces of the panels used to construct the two dividers (240a and 240b) and terminates at apex 251a. The apex 251a defines an angle, $\alpha_6$, the angle between the third length, $L_3$, of the first panel 242a of the first divider 240a, and the corresponding length (not called out) of the second panel 244b of divider 240b.

As discussed above, the device shown in FIG. 3 is constructed using dividers (240a-c) implementing second panels (only 242*a* and 242*c* shown) that are mirror images of the dividers' first panels (only 244*a* and 244*b* shown). Thus, these dividers are substantially symmetrical relative to reference axis Z and have approximately equal geometric shapes/configurations. Each of the dividers (240*a-c*) has substantially the same relative dimensions and angles (e.g. $\alpha_1$ through $\alpha_6$ and $W_4$ through $W_6$) as its neighboring dividers. As a result, for this example, the light-receiving cavities (250*a* and 250*b*) are also substantially symmetrical relative to reference axis Z. In addition, like the dividers (240*a-c*) and the channels (260*a-c*), each light-receiving channel (250*a* and 250*b*) has a first portion (252*a* and 252*b*) defined by the positions (along the Z axis) of the leading edges (230*a-c*) and the first bends (246*a* and 246*a*'), a second portion (254*a* and 254*b*) defined by the positions of the first bends (246*a* and 246*a*') and the second bends (248*a* and 248*a*'), and a third portion (256*a* and 256*b*) defined by the positions of the second bends (248*a* and 248*a*') and the apexes (251*a* and 251*b*). Further, the first portions (252*a* and 252*b*) of the passages (250*a* and 250*b*) are each characterized by a first width, $W_1$, which defines the aperture (220*a* and 220*b*) width. In addition, the second portions (254*a* and 254*b*) of the passages (250*a* and 250*b*) are each characterized by a second width, $W_2$, and the third portions (256*a* and 256*b*) of the passages (250*a* and 250*b*) are characterized by a third width, $W_3$. Again, because the dividers (240*a-c*) of FIG. 3 have a substantially mirror image, symmetrical design, the characteristic widths, $W_1$ through $W_3$, of the passages (250*a* and 250*b*) are substantially equal for each divider (240*a-c*), channel (260*a-c*), and passage (260*a* and 260*b*). However, this is not necessary and other embodiments of the present disclosure may utilize a plurality of dividers that are constructed of panels that are not mirror images and/or a symmetrical design of their counter-part panels. In addition, a receiver may be constructed that utilizes a plurality of different divider designs; e.g. some that are based on mirror image, symmetrical designs, and some that are based on non-symmetrical designs.

Table 1 below provides ranges for each of the design metrics shown in FIG. 3, for a symmetrical receiver having a radius of about 7.5 meters and the receiver radii range from 5 meters to 10. Receivers with different diameters may be scaled according to the values provided in Table 1.

TABLE 1

Receiver Divider, Passage, Channel Metrics
(All lengths in meters, all angles in degrees.)

| Metric | Min | Max |
|---|---|---|
| $W_1$ | 0.05 | 0.5 |
| $W_2$ | 0.01 | 0.1 |
| $W_3$ | 0.01 | 0.1 |
| $W_4$ | 0.02 | 0.2 |
| $W_5$ | 0.01 | 0.1 |
| $W_6$ | 0.01 | 0.1 |
| $L_1$ | 0.02 | 0.2 |
| $L_2$ | 0.02 | 0.2 |
| $L_3$ | 0.02 | 0.2 |
| $\alpha_1$ | 5 | 45 |
| $\alpha_2$ | 5 | 45 |
| $\alpha_3$ | 10 | 45 |
| $\alpha_4$ | 5 | 45 |
| $\alpha_5$ | 10 | 45 |

The receivers described herein may be applied to receivers utilizing multiple heat transfer fluids, including molten salt fluids, gases, and/or solid particles. The dimensions listed in Table 1 are considered more optimal for solid particle systems. The median numbers in Table 1 may be the starting number for design optimization, while the dimensions serve the optimum performance.

Figure 4A:
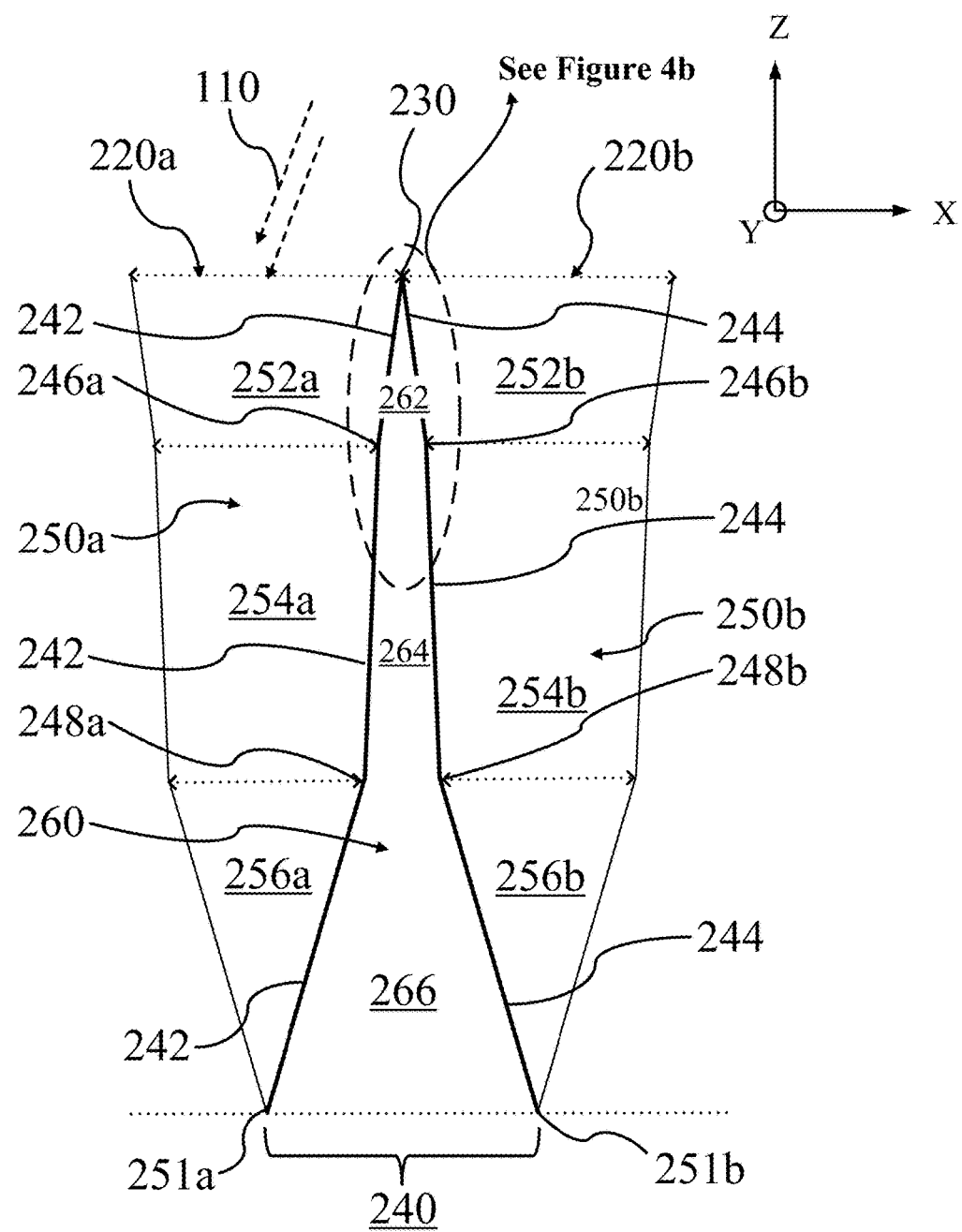
FIG. 4A and FIG. 4B illustrate receiver dividers, light-receiving passages, and heat-transfer channels, according to some embodiments of the present disclosure.

FIG. 4A illustrates an embodiment of the present disclosure that is substantially similar to the embodiment illustrated in FIG. 3, however, now with a focus on the features of only one divider 240. This divider 240 is constructed using a first panel 242 with a first end and a second end that is physically connected by its first end to the first end of a second panel 244 also having a second end. The connection of the first end of the first panel 242 to the first end of the second panel 244 creates leading edge 230. The second panel 244 faces the first panel 242 with channel 260 positioned between the first panel 242 and the second panel 244. The first panel 242 has a first bend 246*a* and a second bend 248*a*. The second panel 244 has a first bend 246*b* and a second bend 248*b*. The bends (246*a* and 248*a*) of the first panel 242 are at substantially the same position along the Z-axis as the bends (246*b* and 248*b*) of the second panel 244. In addition, the bend angles (see FIG. 3) of the bends (246*a* and 248*a*) of the first panel 242 are substantially equal to the bend angles (see FIG. 3) of the bends (246*b* and 248*b*) of the second panel 244. As a result of these similarities, the divider 240 and its channel 260 are substantially symmetrical relative to the Z-axis.

The channel 260 is partitioned into three distinct portions, a first portion 262, a second portion 264, and a third portion 266. The boundaries of the first portion 262 of channel 260 are defined by the segment of the first panel 242 between the leading edge 230 and the first bend 246*a* of the first panel, the segment of the second panel 244 between the leading edge 230 and the first bend 246*b* of the second panel, and the segment (dotted line) connecting the first bend 246*a* to the first bend 246*b*. The boundaries of the second portion 264 of channel 260 are defined by, the segment (dotted line) connecting the first bend 246*a* to the first bend 246*b*, the segment of the first panel 242 between the first bend 246*a* and the second bend 248*a* of the first panel, the segment of the second panel 244 between the first bend 246*b* and the second bend 248*b* of the second panel 244, and the segment (dotted line) connecting the second bend 248*a* to the second bend 248*b*. The boundaries of the third portion 266 of the channel 260 are defined by the segment (dotted line) connecting the second bend 248*a* to the second bend 248*b*, segment of the first panel 242 between the second bend 248*a* of the first panel 242 and apex 251*a*, the segment of the second panel 244 between the second bend 248*b* of the second panel 244 and apex 251*b*, and the segment (dotted line) connecting apex 251*a* and apex 251*b*.

Divider channels having various cross-sectional shapes may result from the segments described above and their relationship to one another. For example, referring again to FIG. 4A, the segments of the first portion 262 of the channel 260 of the divider 240 describe a triangular cross-section (in the XZ-plane). The segments of the second portion 264 and the third portion 266 of the channel 260 describe trapezoidal cross-sections. Similarly, the relative configuration of the panels (242 and 244) of divider 240 relative to neighboring panels define the cross-sectional shapes of the resultant light-receiving passages (220*a* and 220*b*); e.g. the first portions (252*a* and 252*b*) and the second portions (254*a* and 254*b*) of the passages (250*a* and 250*b*) have trapezoidal-shaped cross-sections, and the third portions (256*a* and 256*b*) of the passages (250*a* and 250*b*) have triangular-shaped cross-sections.

Thus, FIG. 4A illustrates that the configuration of the panels of the dividers used to construct a receiver and the relationship of the dividers to their neighboring dividers determine the cross-sectional shapes (in the XZ-plane) of the light-receiving passages and the channels configured for the flow of heat-transfer media (e.g. solid particulates/particles). Thus, any cross-sectional shape for the passages and/or channels may be designed as needed for a particular application. Shapes that fall within the scope of the present disclosure include triangular, trapezoidal, square, rectangular, regular and/or irregular polygons, and/or any other suitable two-dimensional shape defined by straight and/or curved lines.

Figure 4B:
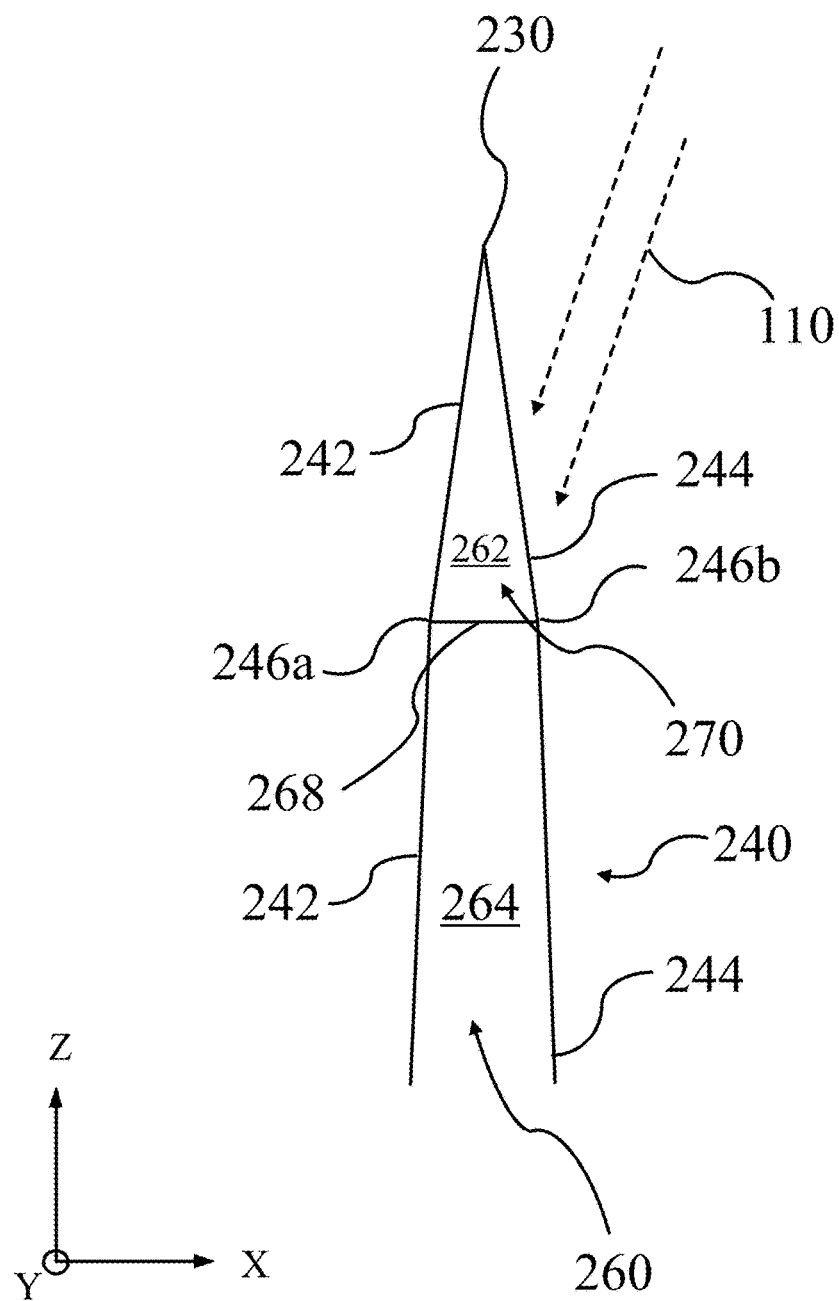

In addition, the cross-sectional shapes of the various portions of the channels and/or passages may be designed to maximize light absorption and heat-spreading in the case of the passages and/or to maximize heat-transfer from the passages to the channels, in the case of the channels. Also, as shown in FIG. 4B, the various portions of the channels may be physically separated from each other; e.g. the first portion 262 of channel 260 may be physically separated from the second portion 264 of the channel by wall 268. Other walls and/or dividers may be used to partition a channel to meet various design criteria and/or operational needs. For example, the separation of the first portion 262 of the channel 260 from the remainder of the channel 260 may enable the first portion 262 of the channel 260 to utilize a first heat-transfer medium, while the remainder of the channel, e.g. the second portion 264, uses a second heat-transfer medium. For example, the wall 268 may isolate the first portion of the channel 260 from the second portion 264 of the channel to create a cooling channel 270 through which a cooling fluid (e.g. water or other suitable liquid) may be circulated to eliminate over-heating of the leading edge 230 and/or minimize the formation of hot-spots on the panel surfaces neighboring the leading edge 230.

Figure 5A:
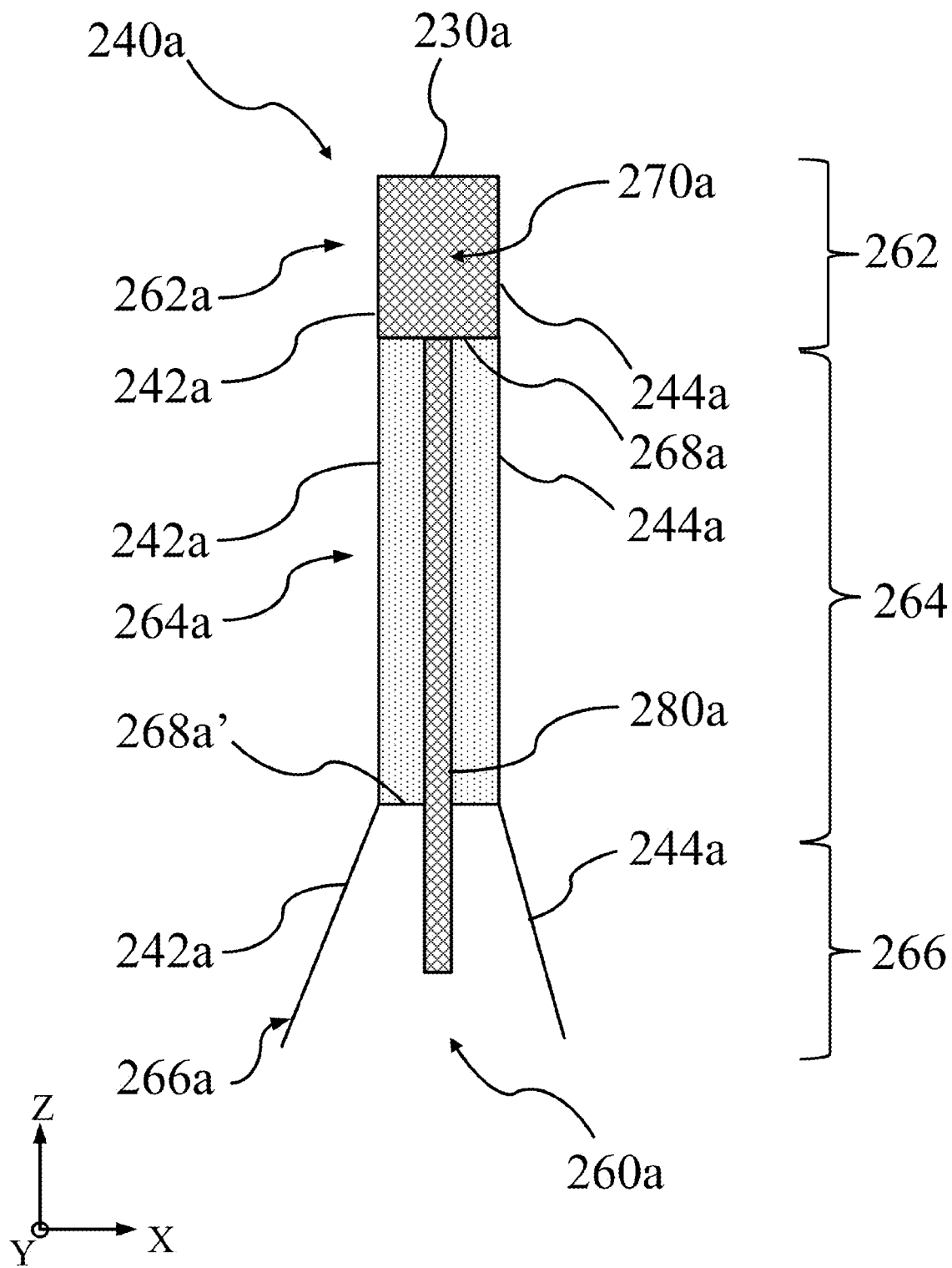
FIGS. 5A-C illustrate receiver dividers with various heat-transfer features, according to some embodiments of the present disclosure.
Figure 5B:
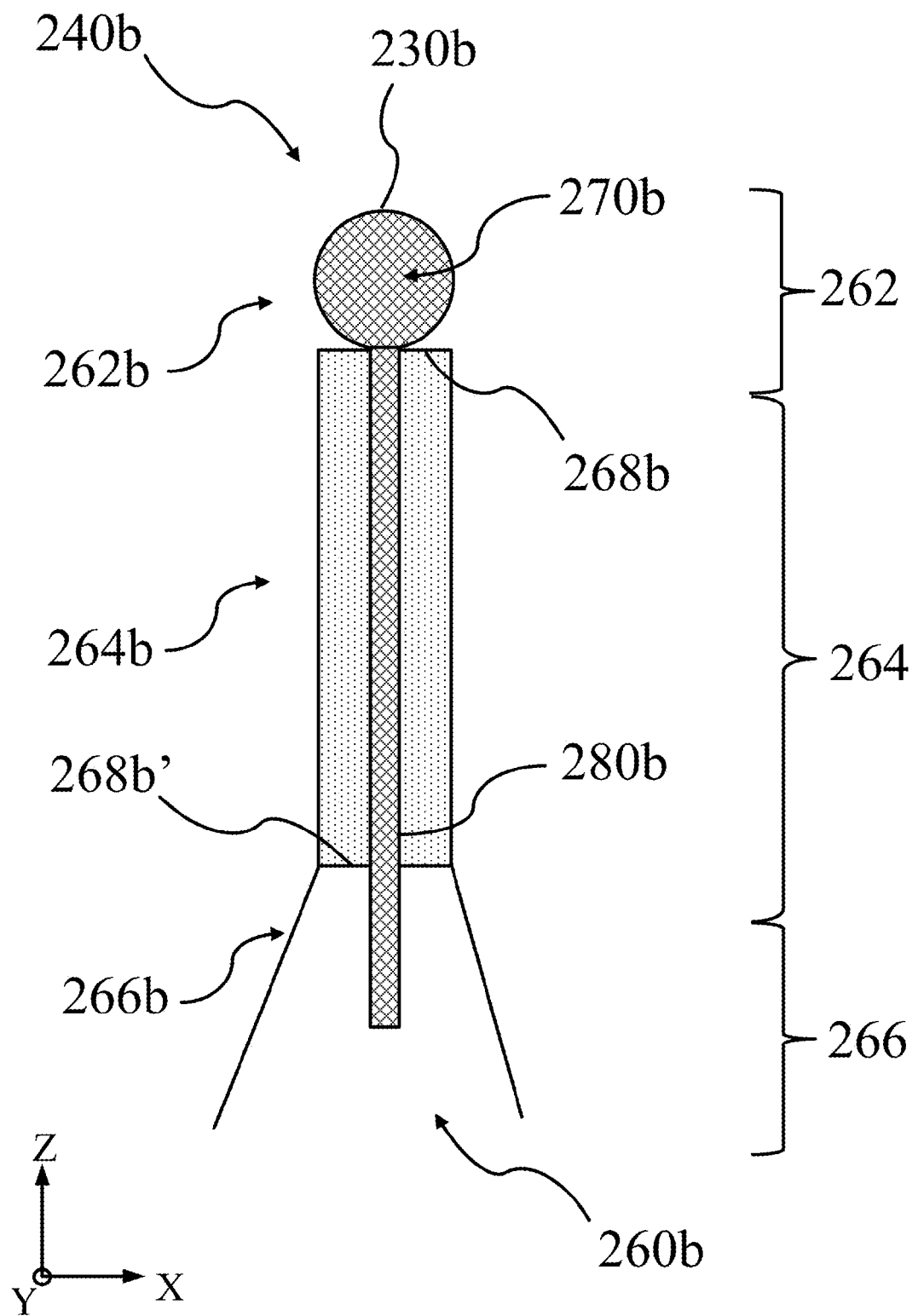
Figure 5C:
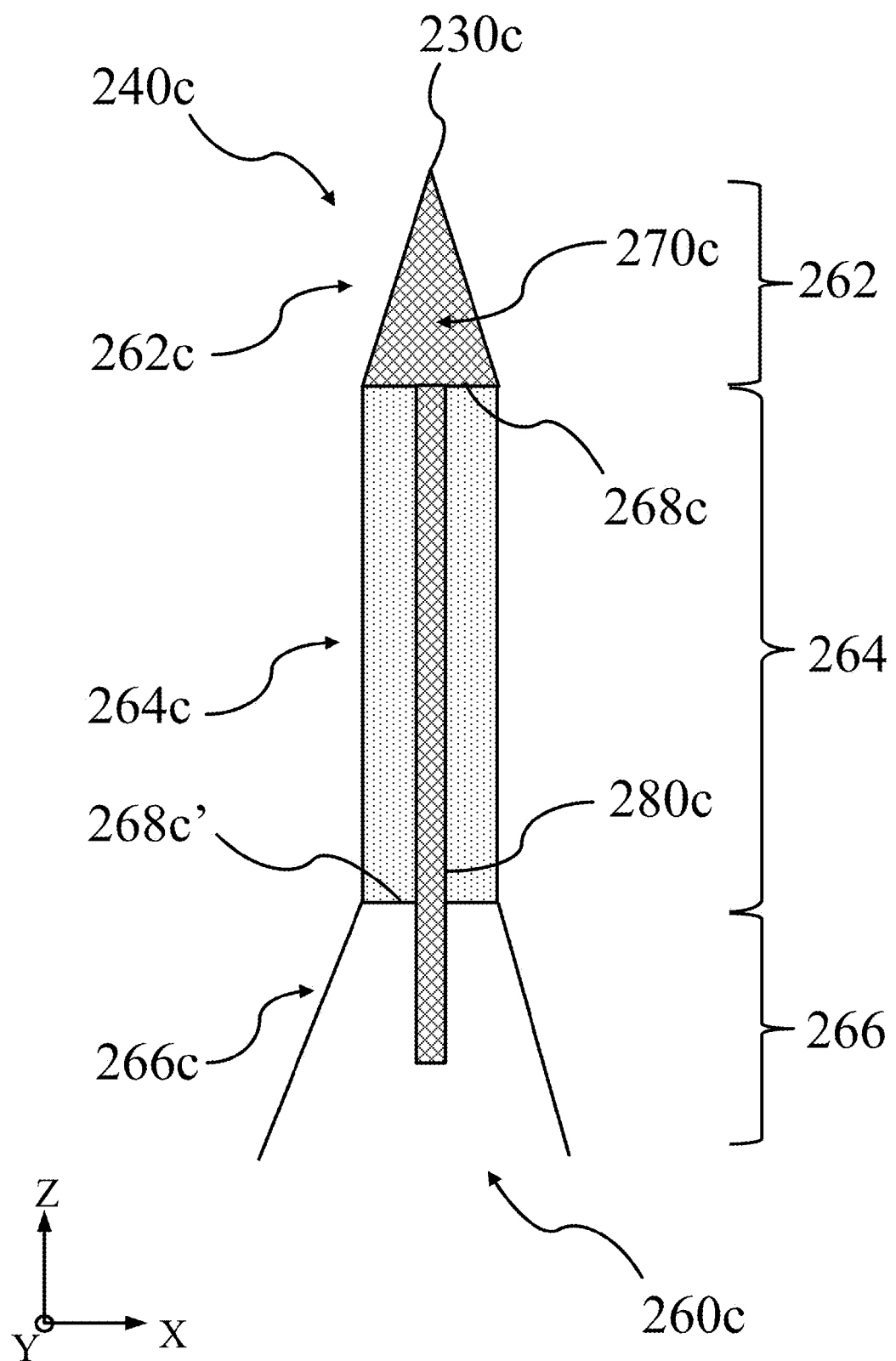

FIGS. 5A-C illustrate three embodiments of dividers 240 for receivers, where each divider is partitioned into three sections that define channels (260a-c) partitioned into three sections (262, 264, and 266). For example, FIG. 5A illustrates a divider 240a with an interior channel 260a configured to absorb energy, where the first portion 262 of the channel 260a has a rectangular cross-sectional shape. The divider 240a also includes a second portion 264 of the channel 260a with a rectangular cross-sectional shape, and a third portion 266 with a trapezoidal cross-sectional shape. Thus, the first section 262 of channel 260a may be configured as a cooling channel 270a with a heat-transfer fluid flowing through the cooling channel 270a, while the second section 264 of channel 260a may be isolated from the first section 262 by first wall 268a and optionally further isolated from the third section 266 of the channel 260a by second wall 268a'. With the second section 262 of channel 260a isolated from the second section 264 of the channel 260a, a different heat-transfer medium may be utilized in the second section of channel 260a, for example solid particles.

FIG. 5A also illustrates a conduit 280a extending from the cooling channel 270 into both the first portion 262 and second portion 264 of the divider channel 260. Such an arrangement may maximize the heat-transfer efficiency of divider 240a by transferring heat absorbed by the leading edge 230a and the first portion 262 of divider 240a to the second heat-transfer medium (e.g. solid particles) flowing through the second portion 262 and/or third portion 264 of channel 260a. This may be accomplished by configuring cooling channel 270a and conduit 280 as a heat-pipe. The details of how a heat-pipe operates will only be briefly described herein. The basic principle is that a heat-pipe is a closed system having a first end/section configured to vaporize a phase-change material by the absorption of energy from the environment exterior to the first/end section of the heat-pipe. In addition, the heat-pipe has a second end/section configured to condense the vaporized phase-change material, thereby transferring the previously absorbed energy out of the "pipe". This arrangement enables the phase-change material to be recirculated between the vaporizing-end of the heat-pipe and the condensing-end of the heat-pipe, thereby transferring energy (the latent heat of the phase-change material) from the vaporizing-end to the condensing-end. Specifically, the phase-change material may be repeatedly vaporized in the vaporizing-end of the heat-pipe, thus transferring energy into the heat-pipe, followed by transport of the vapor to the condensing-end of the heat-pipe, followed by condensation of the vapor in the condensing-end and removal of energy from the heat-pipe, followed by the transport of the condensate back to the vaporizing-end of the heat-pipe.

Thus, in the example of FIG. 5A, the cooling channel 270a and the conduit 280a may together yield a heat-pipe that functions to remove radiant energy absorbed by the leading edge 230a of divider 240a to transport at least a portion of this absorbed energy to the second heat-transfer medium flowing through the second portion 264 and/or third portion 266 of the divider's channel 260a. Since this recovered energy may then be transferred by the heat-exchanger (see FIG. 1) to the working fluid to produce electricity, a heat-pipe configuration may significantly improve the system's overall energy capture efficiency. Examples of suitable phase-change materials for the present disclosure include alkaline metal such as sodium, potassium, and/or lithium, or combinations thereof (e.g. alloys).

FIGS. 5B and 5C illustrate other geometric configurations for the dividers (240b and 240c) and heat-pipes or other alternative cooling systems, including the dividers (240b and 240c) respective channels (260b and 260c), cooling channels (270b and 270c), and conduits (280b and 280c). A circular cross-section of a cylindrical heat shield may be an alternative to the sharp leading edge shield when pressurized fluid needs to be contained for better mechanical strength. Since the face of the cylinder front reflects or emits heat directly to the ambient, its performance may be inferior to a sharp leading edge. The exposed face on the cylindrical surface may be designed to be highly absorptive. Such a design may incorporate quartz tube to transfer heat to the particles flowing through the cylinder-shaped leading edge. Quartz is transparent and may allow the incoming light to directly heat particles flowing through a quartz tube.

Figure 6:
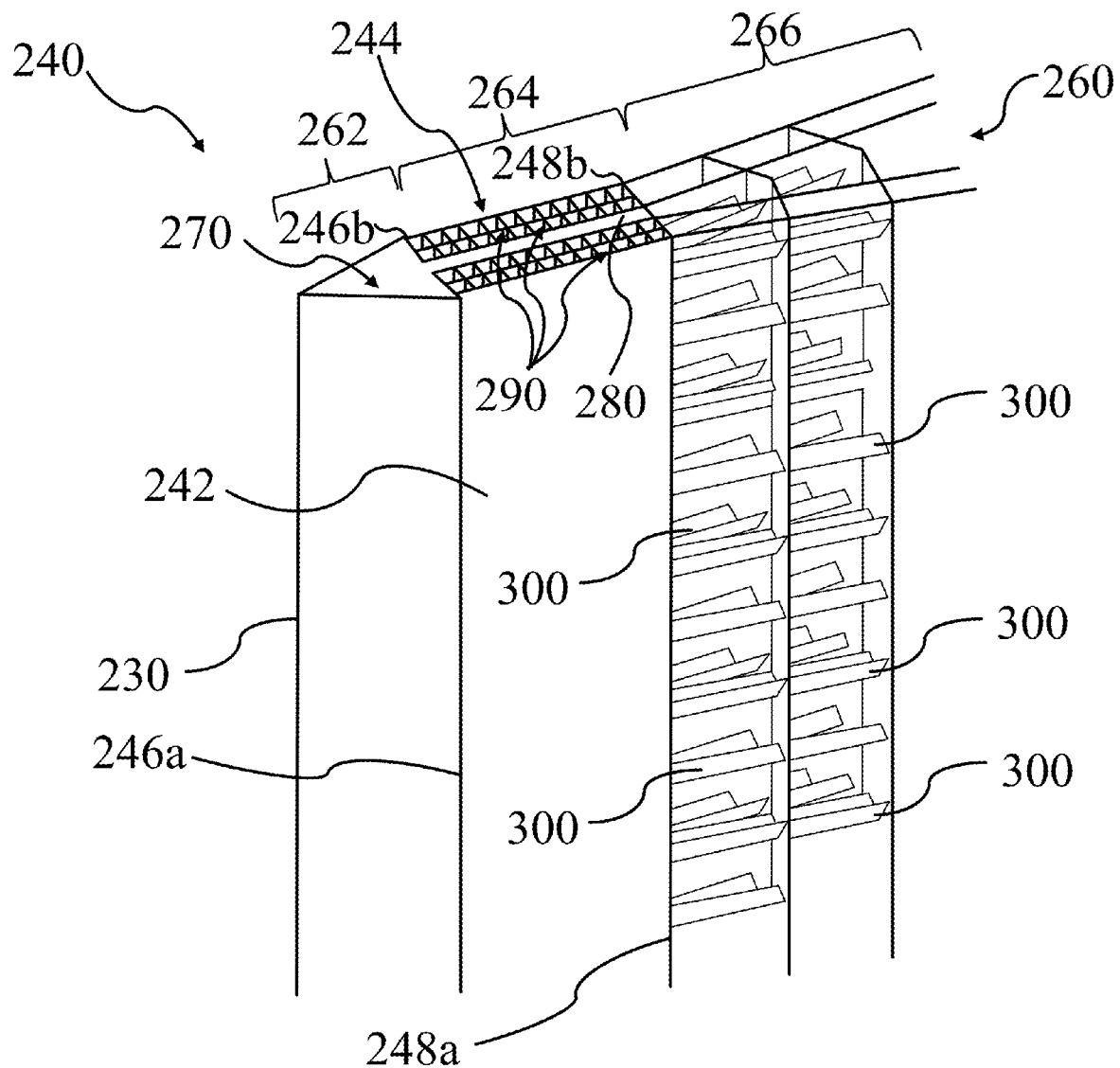
FIG. 6 illustrates a divider configured with a heat-pipe for a phase-change material and configured for the use of solid particles, according to some embodiments of the present disclosure.

FIG. 6 illustrates an embodiment of a divider 240 that is portioned into a first portion 262, a second portion 264, and a third portion 266. The divider 240 is constructed using a first panel 242 and an adjacent second panel 244 to form a channel 260 between the first panel 242 and the second panel 244. The first panel 242 has a first bend 246a and a second bend 248a that partitions the first panel 242 into three sections (262, 264, and 266) as described above. Similarly, the second panel 244 is a mirror-image-design of the first panel 242 and also has a first bend 246b and a second bend 248b that partitions the second panel 244 into three sections (262, 264, and 266). Thus, the second panel 244 is essentially a mirror-image of the first panel 242. The divider 240 of FIG. 6 includes a heat-pipe constructed of a triangular-shaped cooling channel 270 in fluid communication with conduit 280. Thus, the cooling channel 270 serves as the vaporizing-end of a heat-pipe and absorbs radiant energy from the external environment to vaporize a phase-change material contained within the heat-pipe. The vaporized phase-change material is then transferred through the conduit 280 to cooler sections of the channel 260, resulting in the condensation of the vaporized phase-change material to form phase-change material condensate and transfer energy out of the heat-pipe to the heat-transfer medium contained in the second portion 264 and/or third portions 266 of channel 260. In the embodiment illustrated in FIG. 6, the heat-transfer medium contained in the second portion 264 and/or third portions 266 of channel 260 may be solid particles.

The second portion 264 of channel 260 of divider 240 is partitioned into a plurality of sub-channels 290. These sub-channels 290 may be constructed from a plurality of intersecting walls, resulting in a substantially vertical and parallel orientation of the sub-channels 290. A plurality of sub-channels 290 may be utilized to produce a more uniform distribution of solid particle flow through the second portion 264 of channel 260, which may provide more efficient use of the surfaces used to transfer energy from the conduit 280 to the solid particles contained in the sub-channels 290. In addition, the sub-channels 290 in direct contact with the panels (242 and 244) may improve utilization of the outside surfaces of the panels (242 and 244) to absorb light, thus improving heat-transfer efficiency of energy from the light-receiving passages (not shown) to the solid particles contained with the sub-channels 290 of the second portion 264 of channel 260. The intersecting walls forming the sub-channels are arranged in a manner to maximize the heat conduction from the divider walls receiving solar flux to the particles in contact with the ribs. The conductive heat-transfer increases particle heat absorption substantially. The sub-channels may increase the particle residence time inside the divider for improved/additional heating. The sub-channels 290 of FIG. 6 are shown with substantially square cross-sectional areas. Square shapes are, however, not required and any other suitable shape may be used for constructing sub-channels; e.g. rectangular, polygons, circular, etc. In addition, the example of FIG. 6 illustrates two parallel rows of sub-channels 290, relative to the long axis of the divider 240. However, only one row of sub-channels may be used, or a plurality of rows may be used in a portion of a divider.

The third portion 266 of channel 260 of the divider 240 contains another embodiment for uniformly distributing solid particles through the channel 260, again with the primary objective of improving the efficiency of energy transfer from incoming light (not shown) to the solid particles. In this embodiment, the third portion 266 of channel 260 contains a plurality of horizontally (relative to the downward, vertical flow of solid particles) oriented baffles 300. The baffles 300 may be configured as a series of alternating, vertically stacked "hats" and "troughs" to assist with mixing the solid particles and redirecting/redistributing the solid particles relative to the short axis of the divider. In other embodiments only hat-shaped baffles 300 may be use, and in still other embodiments only trough-shaped baffles 300 may be used.

Figure 7:
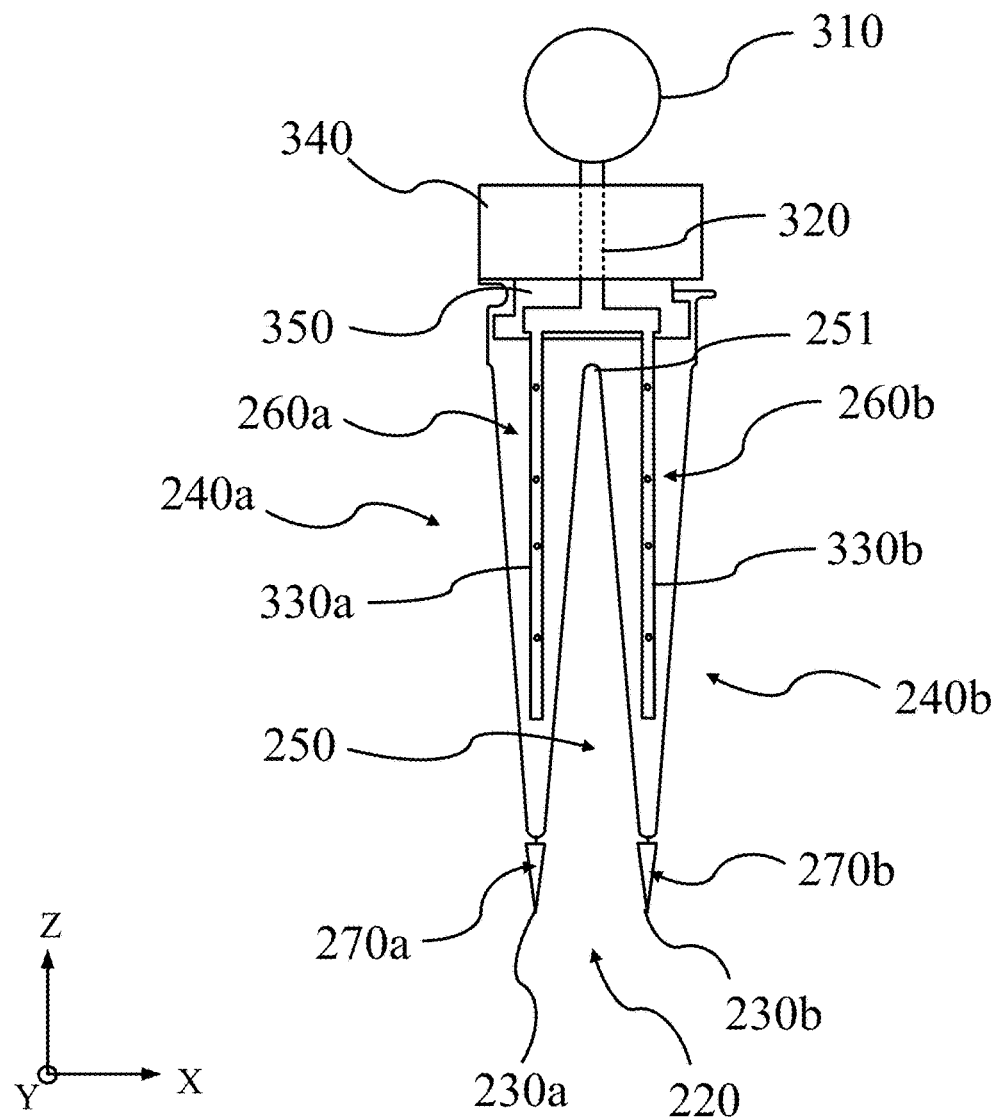
FIG. 7 illustrates a divider configured to fluidize solid particles, according to some embodiments of the present disclosure.

FIG. 7 illustrates additional optional features for some embodiments of dividers used to construct solar receivers. In this example, two neighboring dividers (240a and 240b) are shown, each with only a single, triangular-shaped channel (260a and 260b). Each channel (260a and 260b) has a first portion configured as a triangular cooling channel (270a and 270b), each having a leading edge (230a and 230b). In this example, the cooling channels (270a and 270b) do not function as heat-pipes and instead contain a cooling fluid (liquid and/or gas) that does not change phase. The adjacent dividers (240a and 240b) form light-receiving passage 250 having an aperture 220 at its entrance and an apex 251. Each channel (260a and 260b) also has second portion configured for the flow of solid particles as the heat transfer medium. To assist with solid particle distribution within the second portion of the channels (260a and 260b) each channel is provided with a fluidizing gas line (330a and 330b). The fluidizing gas lines (330a and 330b) provide a fluidizing gas, e.g. an inert such as nitrogen and/or argon, to promote mixing of the solid particles within the channels (260a and 260b). In some examples, each fluidizing gas line (330a and 330b) may include a plurality of holes and/or nozzles spaced along the long axis of the dividers (240a and 240b).

The fluidizing gas may be provided to the fluidizing gas lines (330a and 330b) by a gas supply header 310 that supplies gas to all of the dividers used to construct the receiver. A plurality of gas distribution headers, for example gas distribution header 320, may then branch from the gas supply header 310 to transport gas from the gas supply header 310 to one or more fluidizing gas lines, e.g. fluidizing gas lines 330a and 330b. The gas distribution header 320 may pass through a mechanical support 340 used to anchor the plurality of dividers used to construct the receiver. The fluidizing gas may then exit the channels (260a and 260b) of the dividers (240a and 240b) and leave the system through gas return header 350.

Figure 8A:
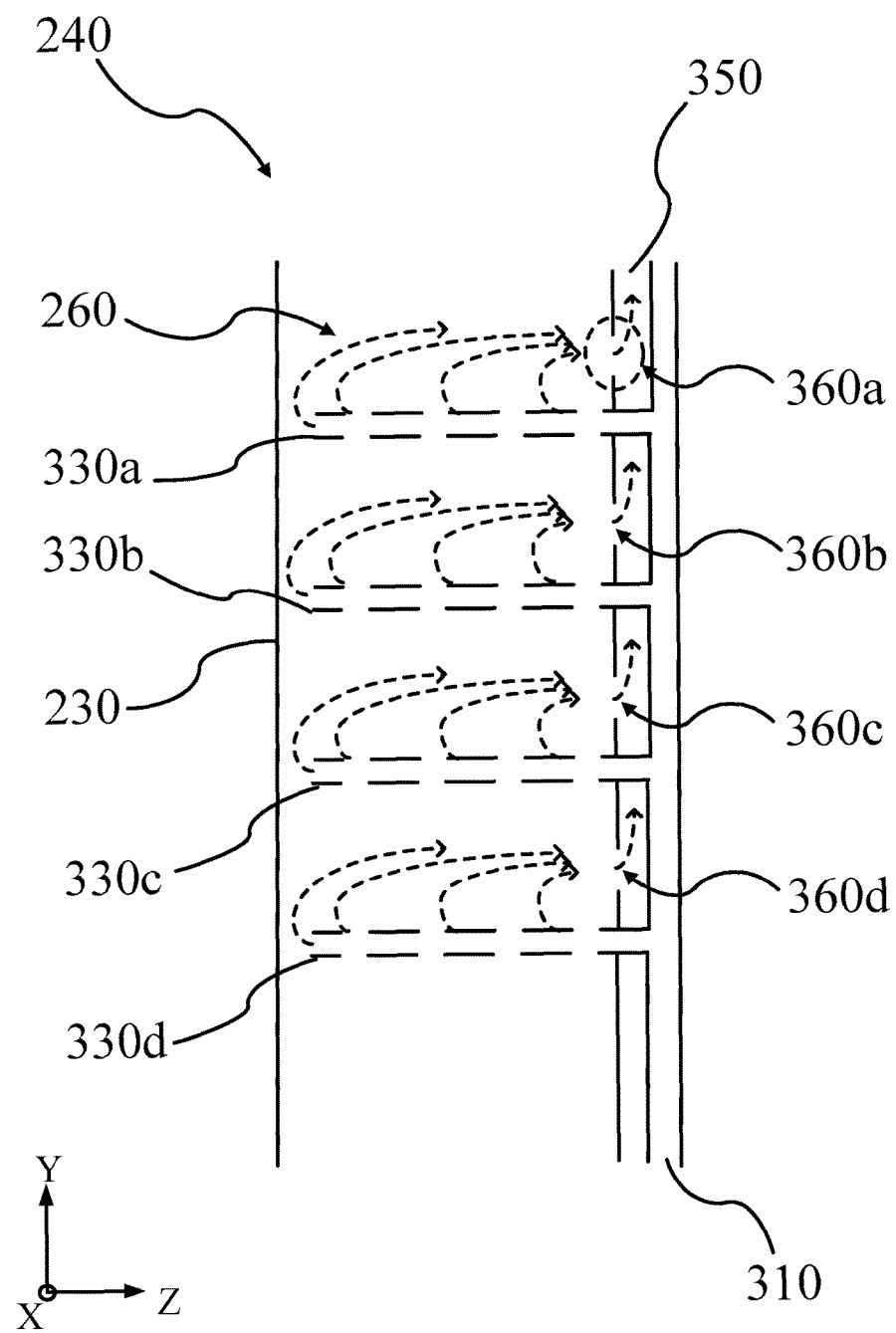
FIG. 8A illustrates a divider configured to fluidize solid particles and FIG. 8B illustrates an exhaust orifice designed to enable fluidizing gas to exit the divider, according to some embodiments of the present disclosure.
Figure 8B:
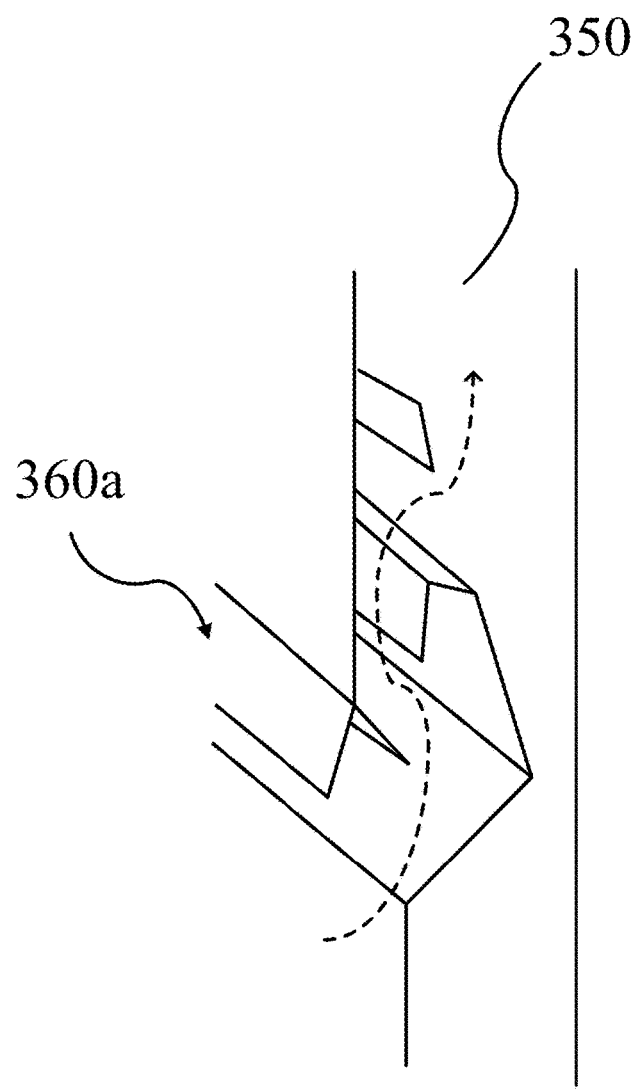

FIG. 8A and FIG. 8B illustrate an example of how a gas supply header 310 may be configured with a gas return header 350 within a divider 240. Referring to FIG. 8B, the gas supply header 310 supplies gas to four fluidizing gas lines (330a-d) spaced at a regular interval along the vertical axis Y. A fluidizing gas is distributed along the long axis (Z) of the divider 240, exiting the fluidizing gas lines (330a-d) at holes/nozzles positioned along the Z-axis of each fluidizing gas line (330a-d). The gas fluidizes the solid particles (not shown) contained within the channel 260, resulting in improved heat transfer from the light-receiving passage (not shown) to the solid particles. The gas passes through the channel 260 by flowing opposite to the direction of the gas entering the divider through the fluidizing gas lines (330a-d) and exits the channel through exhaust orifices (360a-d) and leaves the system through gas return header 350.

FIG. 8B illustrates a gas exhaust orifice 360 for connecting the channel 260 of a divider 240 to a gas return line 350. This gas exhaust orifice 360 is constructed using a plurality of walls arranged to create a channel with a sufficiently low pressure drop to allow the gas to escape the channel 260 while simultaneously creating a tortuous path with a sufficiently low gas velocity that the solid particles may separate from the fluidizing gas to fall by gravity back into the channel 260. Other gas exhaust orifice design may also be designed to allow the fluidizing gas to exit a divider's channel into a gas return header and these alternative designs fall within the scope of the present disclosure.

The examples shown in FIGS. 5A-C and FIGS. 6-8 illustrate that a wide range of divider designs is available that fall within the scope of the present disclosure, where the designs are defined by a number of design metrics and features. These include the design metrics for the panels (242 and 244) discussed in FIG. 3, as well as design features such as cooling channels, heat-pipes, types/number of heat-transfer media used within the divider channel, partitioning walls, sub-channels, baffles, and/or the use of a fluidizing gas and its related hardware.

Examples of receivers describe herein may utilize interior fluidization of falling particles designed to enhance the absorber wall-to-particle heat transfer. An additional possible advantage offered by these example receivers includes the coupling of a novel, highly efficient planar-cavity configuration that uniquely uses solar flux optical characteristics to achieve the light/heat spreading. Some dividers are tapered to smoothly spread the concentrated light onto the receiver panels, where the distributed heat flux may be managed to match the wall-to-particle heat transfer. Such receivers shield the light absorbing panels from direct exposure to the ambient air, thus reducing thermal losses and resulting in high receiver thermal efficiency. The use of heat-collecting materials may protect the front edges of the dividers from overheating and may reflect the incoming light into the light-receiving passages.

The dividers may be manufactured from sheet metal by a stamping process. The dividers may be attached to the receiver support structure by welding, or using a "snapped-on" design. In a snapped-on divider panel design, panels may be provided with extra winglets that may be fastened onto the supporting structure and secured by bolts and nuts. The individual dividers may be attached independently and individual dividers may be interchangeable for easy maintenance or design upgrade.

Figure 9A:
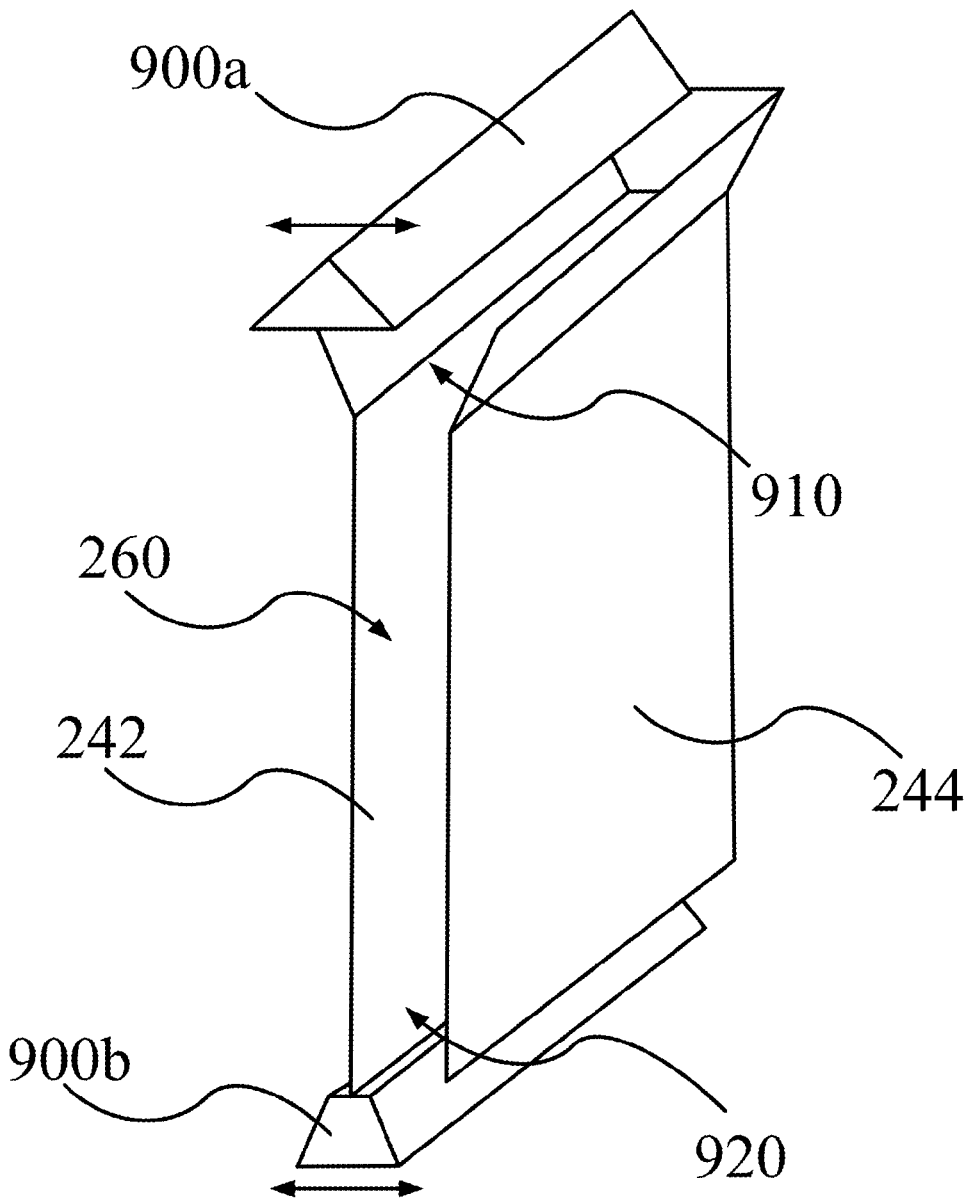
FIG. 9A and FIG. 9B illustrate control valves for controlling the flow of solid particles through the channel of a receiver, according to some embodiments of the present disclosure.
Figure 9B:
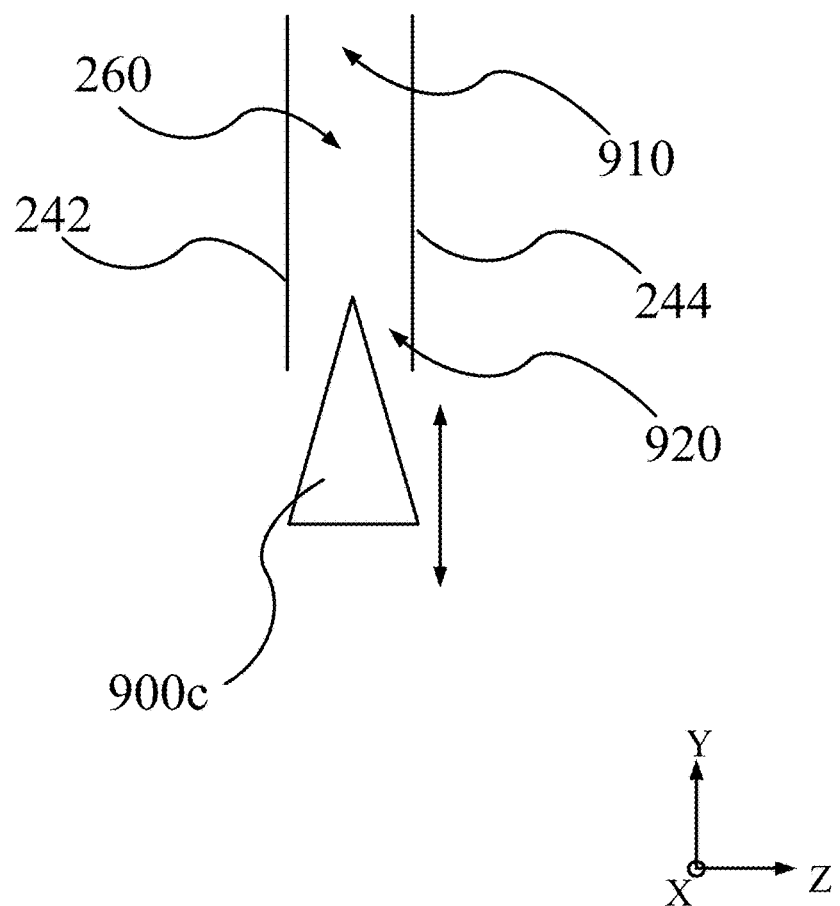

FIG. 9A and FIG. 9B illustrate control valves (900a-c) for controlling the flow of solid particles (not shown) through a channel 260 of a receiver of a concentrating solar power plant as described above. As shown in FIG. 9A, the channel 260 may be the empty volume between a first panel 242 and a second panel 244, as described above. FIG. 9A illustrates two embodiments of a control valve (900a and 900b). Control valve 900a is positioned near the inlet 910 of the channel 260 and control valve 900b is positioned near the outlet 920 of the channel 260. Thus, during operating, solid particles may fall by gravity through the inlet 910 into the channel 260 to eventually exit the channel 260 through the outlet 920. The top control valve 900a may be moveable from side-to-side within the XZ-plane such that the top control valve 900a has at least a first position (closed) which completely blocks the flow of solid particles into the channel 260 and a second position (open) which does not interrupt the flow of solid particles into the channel 260. Precise control of the flow of solid particles into the channel 260 may be attained by moving the top control valve 900a between the first position (closed) and the second position (open). Thus, when the top control valve 900a is in the closed position, no solid particles may enter the channel 260 and the channel 260 may become substantially empty of solid particles. At the other extreme, when the top control valve 900a is in the open position, solid particles may flow unimpeded into the channel 260 such that, in some cases, the empty volume of the channel 260 may become substantially full of solid particles.

Referring again to FIG. 9A, a second control valve 900b is shown positioned near the bottom of the channel 260 of the receiver. Like the top control valve 900a described above, a bottom control valve 900b may be moveable within the XZ-plane such that the bottom control valve 900b has at least a first position (closed) which completely blocks the flow of solid particles exiting the channel 260 and a second position (open) which does not interrupt the flow of solid particles into the channel 260. Precise control of the flow of solid particles out of the channel 260 may be attained by moving the bottom control valve 900b between the first position (closed) and the second position (open). Thus, when the bottom control valve 900b is in the closed position, no solid particles may exit the channel 260 and the channel 260 may become substantially full of solid particles. At the other extreme, when the bottom control valve 900b is in the open position, solid particles may flow unimpeded out of the channel 260 such that, in some cases, the empty volume of the channel 260 may become substantially empty of solid particles.

FIG. 9B illustrates that a control valve 900 may assume any desired geometric shape. For example, similar to that shown for the top control valve 900a of FIG. 9A, the bottom control valve 900c of FIG. 9B is shown in a triangular shape. A triangular-shaped control valve 900c might be especially suited for the control of the flow of solid particles by directing a tip of the triangular control valve 900c into the stream of solid particles such that the expanding sides of the triangular control valve 900c deflect the solid particles without the solid particles directly impinging upon the control valve 900c. This may reduce frictional wear and decrease maintenance costs. In addition, the bottom control valve 900c may control the flow of solid particles exiting the channel 260 by moving up and down in the YX-plane such that the control valve 900c has a first (closed) position when the control valve 900c is completely and/or substantially inserted into the outlet 920 of the channel 260, and a second (open) position when the control valve 900c is pulled out of or substantially out of the channel 260.

EXAMPLES

Modeling results: A full-scale particle receiver was tested by mathematical modeling. Table 2 summarizes the physical dimensions of the full-scale receiver modeled (see FIG. 3 for a reference of the physical dimension corresponding to each parameter).

TABLE 2

Full-scale receiver parameters for modeling

| Parameter | Value | Parameter | Value |
|---|---|---|---|
| Height | 16 m ± 4 m | Solids $T_{in}$ | 500° C. or 200° C. |
| $W_1$ | 6.35 cm ± 2 cm | Solids $T_{out}$ | 900° C. or 750° C. |
| $W_3$ | 6.35 cm ± 2 cm | $h_{conv}$ | 300 W/m$^2$/K |
| $L_1$ | 7.62 cm ± 2 cm | $h_{rad}$ | f($T_{wall}$, $T_s$) |
| $L_2$ | 12.7 cm ± 2 cm | $\rho_{wall}$ (solar) | 0.1 |
| $L_3$ | 17.8 cm ± 2 cm | $\alpha_{wall}$, $\varepsilon_{wall}$ | 0.9 |
| $t_{wall}$ | 0.16 cm ± 2 cm | $\varepsilon_{solids}$ | 0.7 |
| $\alpha_6$ (FIG. 3) | 40° to 50° | Panel material | Haynes 230 |
| | | Heat pipe $k_{eff}$ | 5000 W/m/K |

Figure 10:
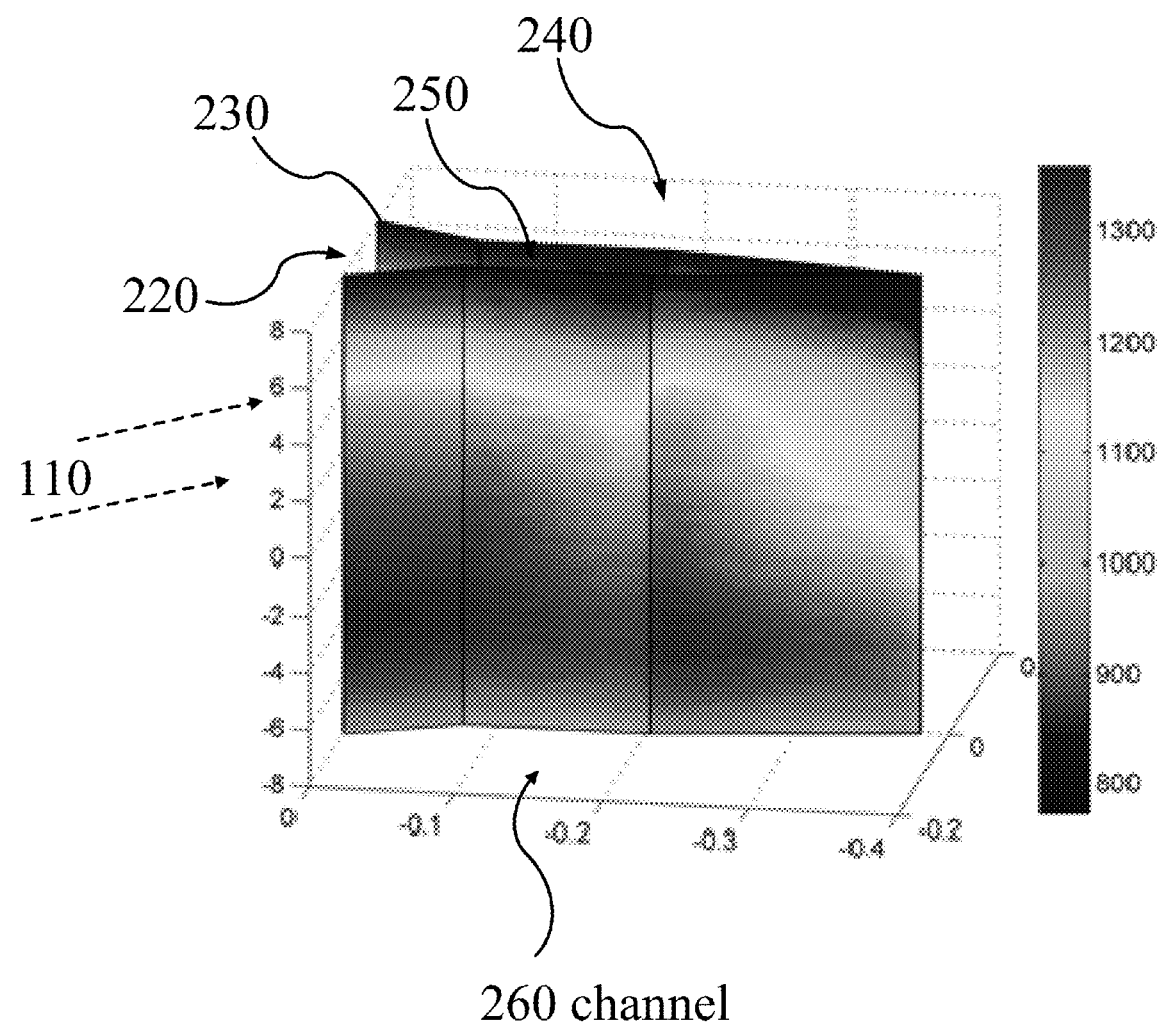
FIG. 10 illustrates simulated wall temperature distribution (K) for a north-facing passage/divider or a full-scale receiver, according to some embodiments of the present disclosure.

FIG. 10 illustrates the simulated wall temperature distribution for a north-facing divider 240 and passage 250 with solid particles having inlet/outlet temperatures of 500/900° C. Note that axis sizing and aspect ratios in FIG. 10 have been scaled to improve visibility. Table 3 describes the simulated solar flux distribution and thermal performance for two configurations with solid particles having inlet/outlet temperatures of 500/900° C. and 200/750° C. respectively. The two configurations differ only in the heat shield vertex angle such that one configuration ($\alpha_6$=50°—see FIG. 3) has a larger aperture 220 and solids channel 260 width, and the second configuration ($\alpha_6$=40°) as a smaller aperture 220 and solids channel 260 width. Peak wall absorbed solar flux is 220-235 kW/m$^2$ with a north-facing cavity average aperture flux of 1055 kW/m$^2$ were obtained. Peak simulated panel wall temperatures were approximately 1080° C. (1353K) for the high solids temperature conditions, and 965° C. (1238K) for the comparatively lower solids temperature conditions. North-facing cavity thermal efficiency ($\eta_{thermal}$) is defined as the energy transferred into the solids phase divided by the energy incident on the aperture of the cavity and is predicted to range from 82.6% for the high solids temperature conditions to 88.4% for the lower solids temperature conditions.

TABLE 3

Modeling data for a north-facing divider/passage

| | $\Theta_1 = 25°$ | | $\Theta_1 = 20°$ | |
|---|---|---|---|---|
| Avg. aperture $q_{inc}$ (kW/m$^2$) | 1055 | | 1055 | |
| Avg. panel $q_{abs}$ (kW/m$^2$) | 100 | | 100 | |
| Peak panel $q_{abs}$ (kW/m$^2$) | 235 | | 220 | |
| Avg. shield $q_{abs}$ (kW/m$^2$) | 445 | | 380 | |
| Solar reflection loss | 4.0% | | 3.6% | |
| Solids inlet/outlet T (° C.) | 500/900 | 200/750 | 500/900 | 200/750 |
| Peak heat pipe T (° C.) | 1087 | 970 | 1056 | 933 |
| Peak panel T (° C.) | 1080 | 963 | 1081 | 966 |
| IR rad. loss | 11.3% | 6.9% | 10.5% | 6.3% |
| Natural convection loss | 2.1% | 1.6% | 2.3% | 1.8% |
| $\eta_{thermal}$ | 82.6% | 87.4% | 83.5% | 88.4% |

Figure 11:
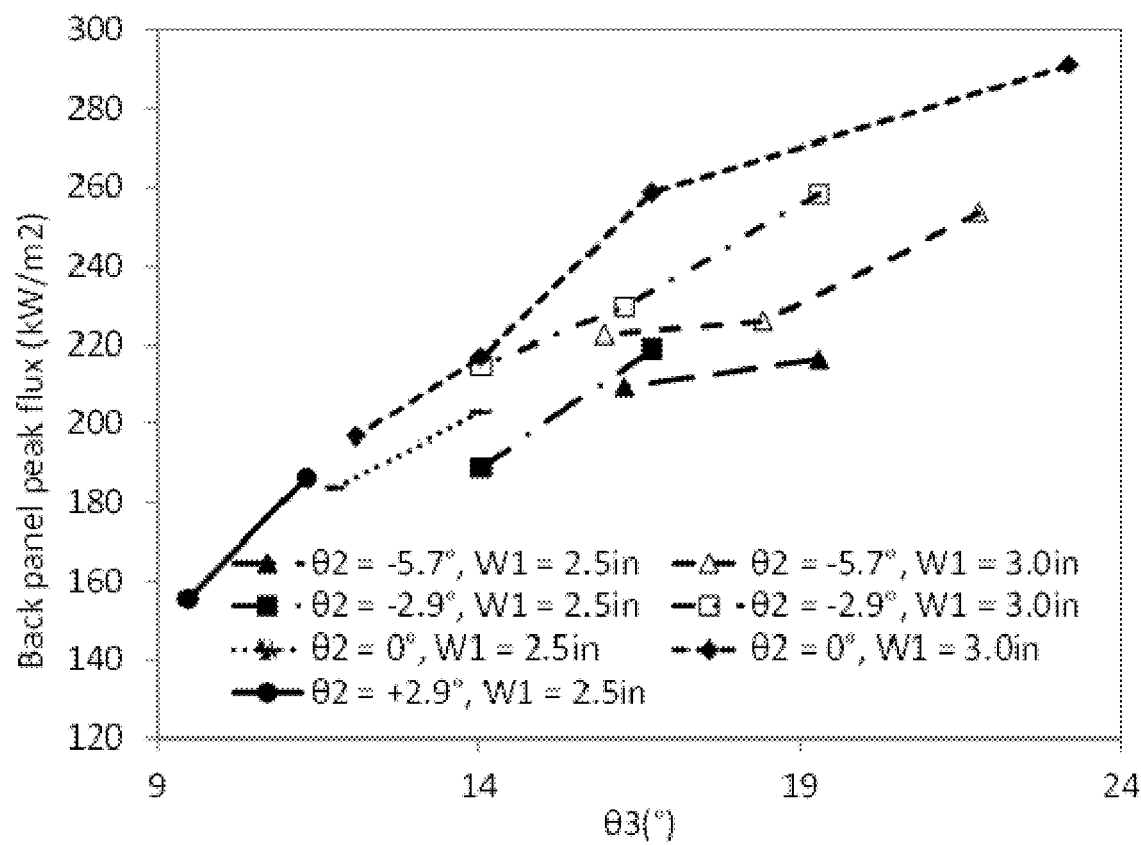
FIG. 11 illustrates sensitivity simulation study results for a back panel peak flux with $\alpha=0.9$ for a full-scale receiver, according to some embodiments of the present disclosure.
Figure 12:
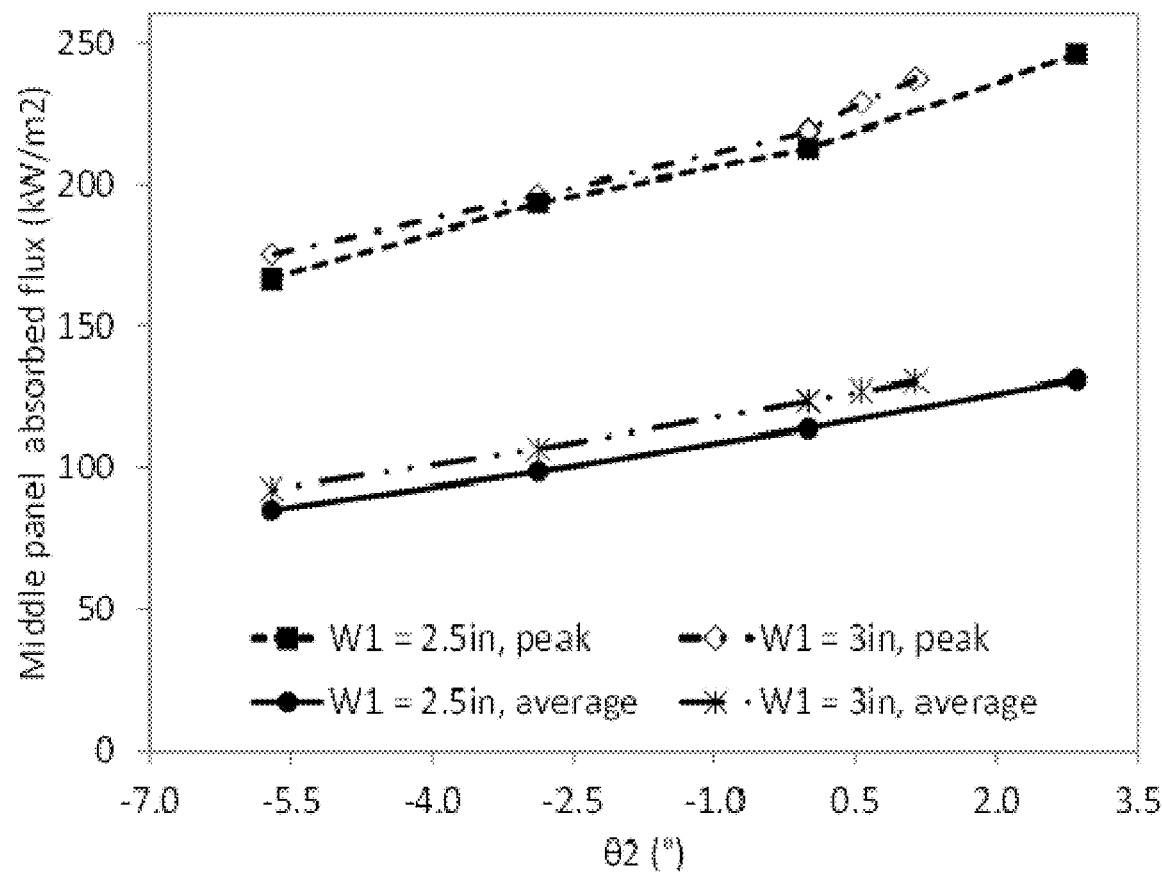
FIG. 12 illustrates sensitivity simulation study results for a front panel peak flux with $\alpha=0.9$ for a full-scale receiver, according to some embodiments of the present disclosure.

FIG. 11 and FIG. 12 illustrate the sensitivity of a peak solar flux absorbed on each the front and back receiver panels with respect to the front cavity aperture width and panel size and orientation. All calculations utilized an identical heliostat field layout and fixed values of $L_1=3.0$ in, $L_2=5$ in, $\alpha_6=60°$. Reflectivity is fixed at 0.1 for each panel and divider wall. Peak absorbed solar flux is highly sensitive to the panel orientation and positioning relative to the incoming beam of light, and may likely be further reduced through rigorous evaluation within the parameter space described in FIG. 10.

TABLE 4

Pilot-scale receiver parameters for actual testing

| Dimension | Design 1 In (cm) | Design 2 In (m) | Design 3 In (m) |
|---|---|---|---|
| $W_2$ | 1.0 (2.54) | 0.75 (1.91) | 0.81 (2.06) |
| $L_2$ | 7.0 (17.78) | 7.0 (17.78) | 4.6 (11.68) |
| $W_3$ | 0.85 (2.16) | 0.64 (1.63) | 0.71 (1.80) |
| $L_3$ | 2.0 (5.08) | 2.5 (6.35) | 3.4 8.64) |
| $W_5$ | 1.0 (2.54) | 1.0 (2.54) | 1.0 (2.54) |
| H | 4.0 (10.16) | 4.0 (10.16) | 4.0 (10.16) |
| $L_1$ | 1.5 (3.81) | 1.5 (3.81) | 1.5 (3.81) |

Figure 13:
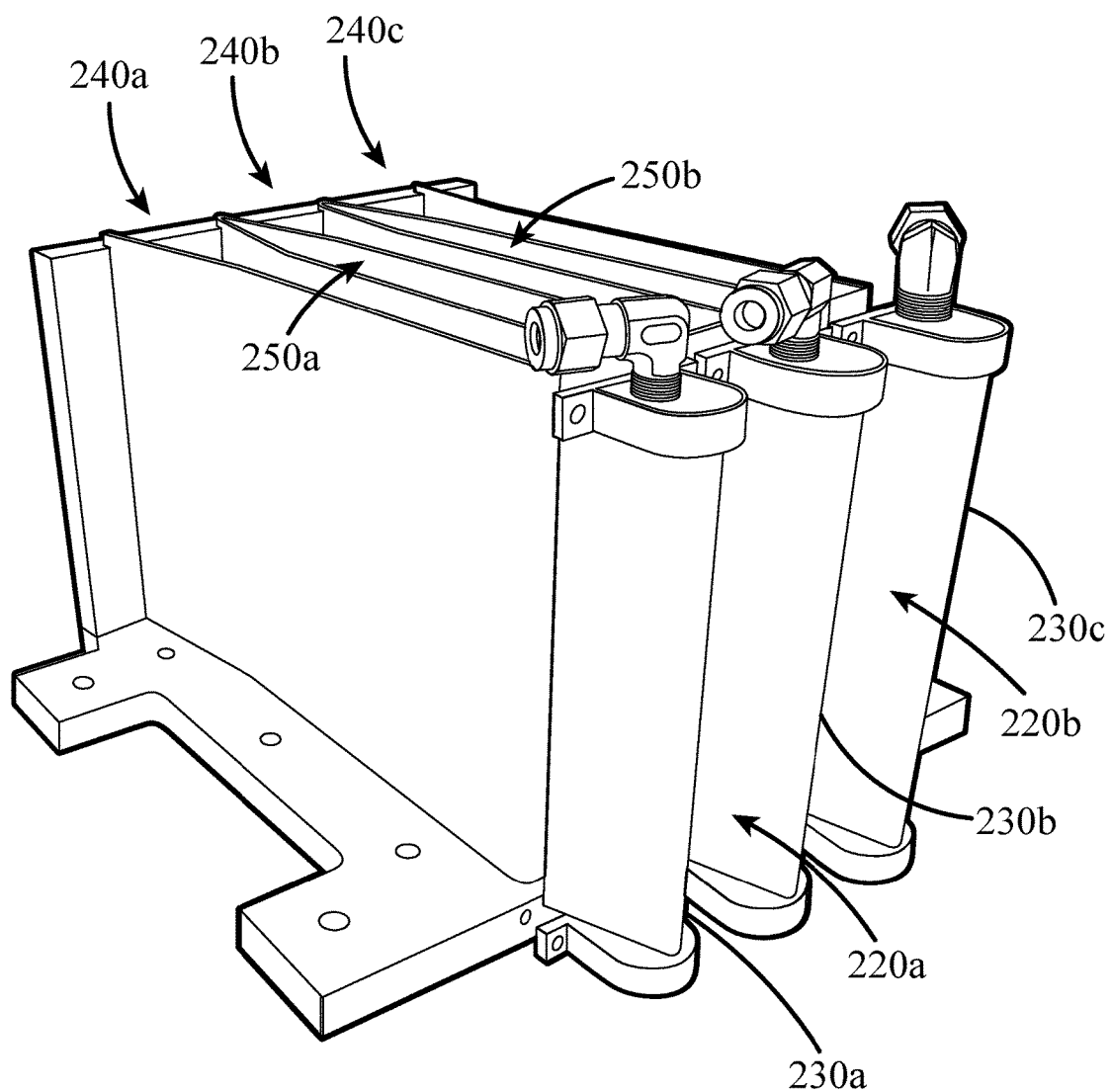
FIG. 13 shows a photograph of a pilot-scale receiver, according to some embodiments of the present disclosure.

FIG. 13 is a photograph of the pilot-scale receiver 130 summarized in Table 4 and illustrates many of the features of the receiver 130 described above, constructed of three dividers (240a-c) each having a liquid-cooled leading edge (230a-c), apertures (220a and 220b) for receiving light into passages (250a and 250b), etc. The pilot-scale receiver illustrated in FIG. 13 is shown in an initial un-oxidized state prior to exposure to high temperature conditions. This receiver design used careful panel sizing/orientation to maintain low local wall absorbed flux (<200 kW/m$^2$) despite high surface absorptivity (0.9) and high incident aperture flux (≥1000 kW/m$^2$). A water-cooled diffusely-reflective heat shield was applied at the leading edges (230a-c) of this design, which may be substituted by a heat pipe in a full-scale receiver. The receiver illustrated in FIG. 13 was constructed from a high temperature metal alloy (Haynes 230).

Figure 14:
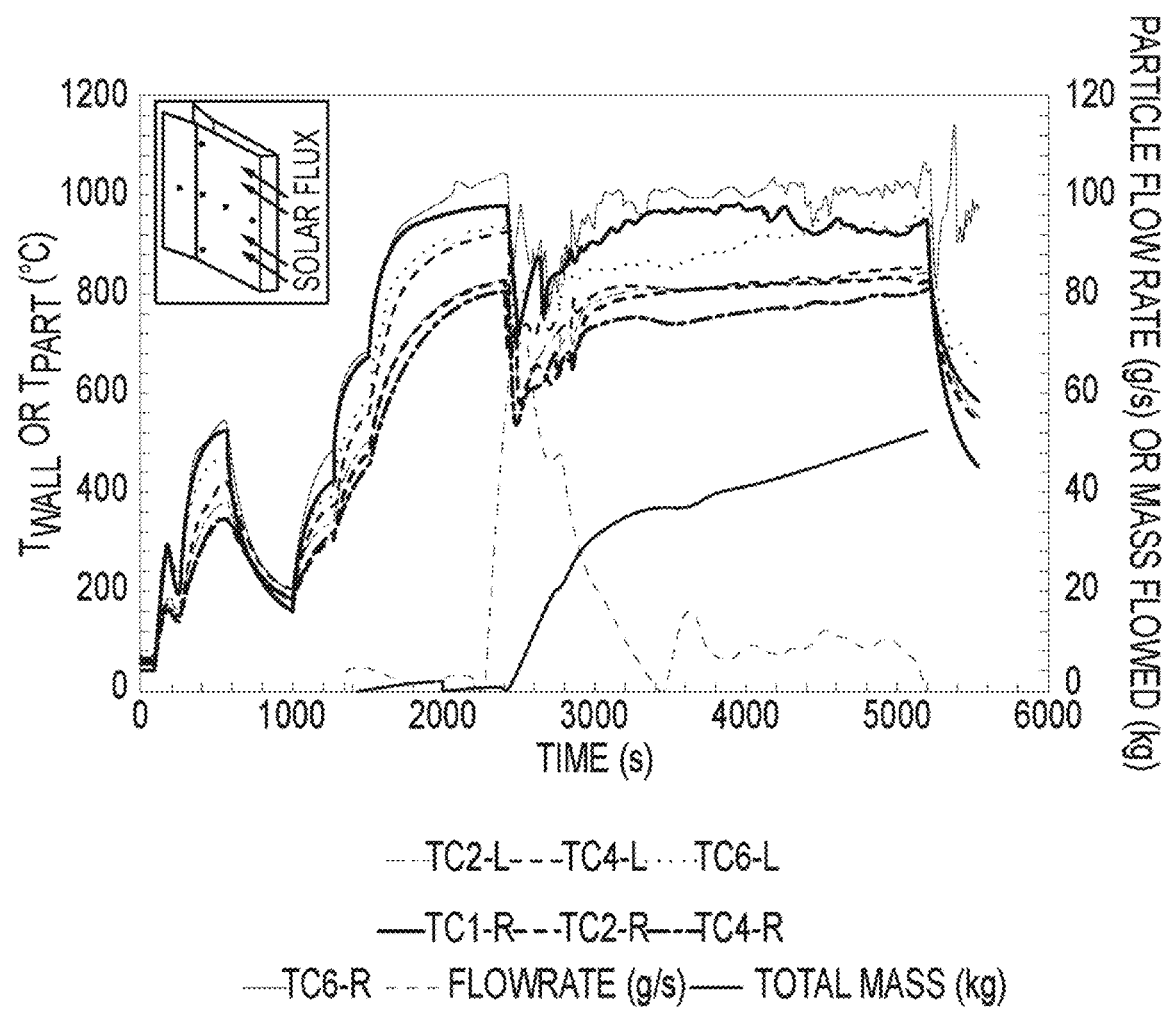
FIG. 14 illustrates experimental data, measure wall temperatures and particle flow rates obtained from on-sun testing of the pilot-scale receiver illustrated in FIG. 13, according to some embodiments of the present disclosure.

FIG. 14 illustrates experimental data collected using the receiver illustrated in FIG. 13. Testing was conducted with Carbo Accucast ID50 particles which have a particle size between 200-300 μm. Particle flow was regulated with two orifice plates. The inlet had 0.058" wide slots and the outlet had 0.048" wide slots. Particle flow was initiated after t=2200 seconds. Direct normal irradiance (DNI) ranged from 980-995 W/m$^2$ during the duration of the test. An approximately 50° C. difference between the particle outlet and particle inlet temperatures was observed through the steady state region (t>3500s). FIG. 14 illustrates measured receiver particle-side wall temperatures along the depth of the receiver at the centerline of each the left (L) and right (R) sides of the center solids channel.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present disclosure, the Applicants in no way disclaim these technical aspects, and it is contemplated that the claimed disclosure may encompass one or more of the conventional technical aspects discussed herein. Thus, the following claims are hereby incorporated into this Detailed Description, with each claim standing on its own as a separate aspect, embodiment, or configuration.

What is claimed is:

1. A device comprising:
    a first panel comprising a first bend, a first height, a first end, and a second end such that a first length is defined between the first end and the second end; and
    a second panel comprising a second bend, a second height, a third end, and a fourth end such that a second length is defined between the third end and the fourth end, wherein:
    the first height and the second height are substantially parallel to a reference axis,
    the first end and the third end intersect to form a leading edge that is substantially parallel to the reference axis,
    the first bend is substantially parallel to the leading edge such that the first bend creates a first portion of the first panel and a second portion of the first panel,
    the second bend is substantially parallel to the leading edge such that the second bend creates a third portion of the first panel,
    the first portion includes the leading edge,
    the second portion is adjacent to the first portion,
    the first bend defines a first width between the first panel and the second panel,
    the third portion is adjacent to the second portion and includes the second end,
    the second bend defines a second width between the first panel and the second panel,
    the second width is larger than or equal to the first width,
    the first panel and the second panel form a channel positioned between the first panel and the second panel,
    the channel is configured for the flow of a first heat-transfer medium through the channel, and
    at least a part of the first panel and at least a part of the second panel are configured to absorb electromagnetic radiation to transfer energy from the electromagnetic radiation to the first heat-transfer medium.

2. The device of claim 1, wherein the first panel and the second panel intersect to form a first angle that is between about 5° and about 60° at the leading edge.

3. The device of claim 1, wherein the first length is substantially equal to the second length.

4. The device of claim 1, wherein the first width has a value between about 0.05 meters and about 0.5 meters.

5. The device of claim 1, wherein:
the second panel further comprises a third bend that is substantially parallel to the leading edge such that the third bend creates a first portion of the second panel and a second portion of the second panel,
the first portion of the second panel includes the leading edge, and
the second portion of the second panel is adjacent to the first portion.

6. The device of claim 5, wherein:
the second panel further comprises a fourth bend that is substantially parallel to the leading edge such that the fourth bend creates a third portion of the second panel, and
the third portion of the second panel is adjacent to the second portion of the second panel and includes the fourth end.

7. The device of claim 6, wherein the first portion of the first panel and the first portion of the second panel have a reflective surface.

8. The device of claim 6, wherein the second portion and the third portion of the first panel, and the second portion and the third portion of the second panel have a light-absorbing surface.

9. The device of claim 6, wherein a second heat-transfer medium is configured to flow between the first portion of the first panel and the first portion of the second panel.

10. The device of claim 9, wherein the second heat-transfer medium comprises at least one of a cooling fluid or a phase-change material.

11. The device of claim 1, wherein the first length is about equal to the second length and has a value between about 0.02 meters and about 0.6 meters.

12. The device of claim 1, wherein the second panel is substantially a mirror-image of the first panel.

13. The device of claim 1, further comprising:
a third panel comprising a third height, a fifth end, and a sixth end, such that a third length is defined between the fifth end and the sixth end, wherein:
the third height is substantially parallel to the reference axis,
the second end and the sixth end intersect to form an apex that is substantially parallel to the reference axis,
the first end and the fifth end form an aperture configured to receive the electromagnetic radiation through the aperture,
the first panel and the third panel form a passage positioned between the first panel and the third panel, and
at least a portion of the third panel is configured to absorb at least a portion the electromagnetic radiation to transfer energy from the electromagnetic radiation to the first heat-transfer medium.

14. The device of claim 1, further comprising a gas supply header positioned within the channel configured to supply a gas.

15. The device of claim 1, further comprising a baffle positioned within the channel.

16. The device of claim 1, further comprising a control valve positioned at at least one of an inlet to the channel or an outlet from the channel.

17. A method for collecting electromagnetic radiation, the method comprising:
directing the electromagnetic radiation towards the device of claim 1;
receiving at the device of claim 1 the electromagnetic radiation; and
transferring a portion of the electromagnetic radiation to a heat-transfer medium flowing through the device of claim 1.

18. The method of claim 17, wherein the directing is performed by a heliostat field.

\* \* \* \* \*